(12) United States Patent
Park et al.

(10) Patent No.: US 11,748,126 B2
(45) Date of Patent: Sep. 5, 2023

(54) ELECTRONIC DEVICE FOR SUPPORTING CUSTOMIZED MANUAL

(71) Applicant: Samsung Electronics Co., Ltd., Gyeonggi-do (KR)

(72) Inventors: Joohee Park, Gyeonggi-do (KR); Joohee Jung, Gyeonggi-do (KR); Changwon Kim, Gyeonggi-do (KR); Youngchan Woo, Gyeonggi-do (KR); Joonhye Baek, Gyeonggi-do (KR); Gulji Chung, Gyeonggi-do (KR); Para Kang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/103,422

(22) Filed: Nov. 24, 2020

(65) Prior Publication Data

US 2021/0182087 A1 Jun. 17, 2021

(30) Foreign Application Priority Data

Dec. 16, 2019 (KR) .................. 10-2019-0168306

(51) Int. Cl.
*G06F 9/451* (2018.01)
*G06F 3/0484* (2022.01)
*H04W 88/02* (2009.01)

(52) U.S. Cl.
CPC ............ *G06F 9/453* (2018.02); *G06F 3/0484* (2013.01); *H04W 88/02* (2013.01)

(58) Field of Classification Search
CPC .................................................. G06F 3/0482
See application file for complete search history.

(56) References Cited

U.S. PATENT DOCUMENTS 9,824,601 B2 * 11/2017 Grimaud .................. G09B 5/00
2007/0033261 A1 2/2007 Wagner et al.
(Continued)

FOREIGN PATENT DOCUMENTS

JP 2015-201056 11/2015
KR 1020150019368 2/2015
(Continued)

OTHER PUBLICATIONS

International Search Report dated Feb. 9, 2021 issued in counterpart application No. PCT/KR2020/015218, 4 pages.

*Primary Examiner* — Di Xiao
(74) *Attorney, Agent, or Firm* — The Farrell Law Firm P.C.

(57) ABSTRACT

An electronic device is provided and includes a communication circuit, a memory, and a processor connected to the communication circuit and the memory. The memory may store instructions causing, upon being executed, the processor to store a usage history in the memory, the usage history collected from a plurality of user devices registered in a user device group through the communication circuit, to receive device information indicating functions of a first user device in the user device group from the first user device or a second user device in the user device group through the communication circuit, to select a function to be recommended to a user from among the functions of the first user device, based on at least the usage history, to generate a customized manual to allow the user to use the recommended function of the first user device, and to transmit, to the first user device or the second user device through the communication circuit, the customized manual or recommendation information for recommending the customized manual to the user.

19 Claims, 23 Drawing Sheets

(56) References Cited

U.S. PATENT DOCUMENTS

| | | | |
|---|---|---|---|
| 2009/0311999 A1* | 12/2009 | Sarkar | H04M 3/02 |
| | | | 455/418 |
| 2010/0238183 A1 | 9/2010 | Sakanaka et al. | |
| 2011/0302300 A1 | 12/2011 | Kikkawa et al. | |
| 2013/0110520 A1* | 5/2013 | Cheyer | G06F 16/3329 |
| | | | 704/275 |
| 2013/0139089 A1 | 5/2013 | Cho et al. | |
| 2014/0280877 A1* | 9/2014 | Koulomzin | G06F 3/0481 |
| | | | 709/224 |
| 2018/0121036 A1 | 5/2018 | Moore et al. | |
| 2019/0138530 A1 | 5/2019 | Yoshitake et al. | |
| 2019/0164193 A1* | 5/2019 | Drake | G06Q 30/0271 |
| 2019/0278619 A1* | 9/2019 | Gupta | G09B 7/00 |
| 2019/0361575 A1* | 11/2019 | Ni | H04L 67/535 |
| 2019/0361719 A1* | 11/2019 | Vangala | G06F 9/453 |
| 2020/0097774 A1* | 3/2020 | Stucki | G06Q 10/20 |
| 2021/0081189 A1* | 3/2021 | Nucci | H04L 41/20 |

FOREIGN PATENT DOCUMENTS

| | | |
|---|---|---|
| WO | WO 2004/102925 | 11/2004 |
| WO | WO 2014-102925 | 11/2004 |

* cited by examiner

ELECTRONIC DEVICE FOR SUPPORTING CUSTOMIZED MANUAL

CROSS-REFERENCE TO RELATED APPLICATION(S)

This application is based on and claims priority under 35 U.S.C. § 119(a) to Korean Patent Application No. 10-2019-0168306, filed on Dec. 16, 2019, in the Korean Intellectual Property Office, the disclosure of which is incorporated by reference herein in its entirety.

BACKGROUND

1. Field

The disclosure relates generally to a customized manual for using an electronic device.

2. Description of Related Art

An electronic device may provide a manual through a user interface. The manual may guide various functions of the electronic device to a user and also help the user to manipulate or set such functions.

As the electronic device is advanced and diversified, the manual becomes complicated. Thus, the user may have limited use of the electronic device or often have difficulty in finding and manipulating a desired function.

Through an interface screen, the electronic device may recommend certain settings (or options) (e.g., a water temperature, the number of rinses, and a spin-dry strength, in the case of a washing machine) with respect to an arbitrary function and/or a particular function selected by the user. However, this recommendation may not always be useful for every user group using the electronic device. For example, such a recommendation may be useful for a particular user group, but may be a function or setting irrespective of interest or preference for other user groups. Here, a user group may contain one or more persons. For example, a user group may refer to a group (or community) that is grouped in a designated relationship (e.g., a family) and uses a common electronic device.

SUMMARY

According to an aspect of the disclosure, an electronic device includes a communication circuit, a memory, and a processor connected to the communication circuit and the memory. The memory may store instructions causing, upon being executed, the processor to store, in the memory, a usage history collected from a plurality of user devices registered in a user device group through the communication circuit, to receive device information indicating functions of a first user device in the user device group from the first user device or a second user device in the user device group through the communication circuit, to select a function to be recommended to a user from among the functions of the first user device, based on at least the usage history, to generate a customized manual to allow the user to use the recommended function of the first user device, and to transmit, to the first user device or the second user device through the communication circuit, the customized manual or recommendation information for recommending the customized manual to the user.

According to another aspect of the disclosure, a mobile electronic device includes a communication circuit, a display, a memory, and a processor connected to the communication circuit, the display, and the memory. The memory may store instructions causing, upon being executed, the processor to store a usage history in the memory, the usage history collected from a plurality of user devices registered in a user device group through the communication circuit, to receive device information indicating functions of an external electronic device from the external electronic device through the communication circuit, to select a function to be recommended to a user from among the functions of the external electronic device, based on at least the usage history, to generate a customized manual to allow the user to use the recommended function, and to display, through the display, recommendation information for recommending the customized manual to the user.

According to another aspect of the disclosure, a mobile electronic device includes a communication circuit, a touch-sensitive display, a memory, and a processor connected to the communication circuit, the display, and the memory. The memory may store instructions causing, upon being executed, the processor to transmit device information indicating a type of a first user device and functions of the first user device to a server through the communication circuit, to receive, from the server through the communication circuit, a customized manual for allowing a user to use a function selected by the server from among the functions of the first user device, to display, through the display, a first message for confirming whether to use the customized manual on the first user device, to receive a user input through the display in response to the first message, and to transmit the customized manual to the first user device when the user input indicates that the customized manual is to be used on the first user device.

BRIEF DESCRIPTION OF THE DRAWINGS

The above and other aspects, features and advantages of certain embodiments of the disclosure will be more apparent from the following description taken in conjunction with the accompanying drawings, in which.

DETAILED DESCRIPTION

Figure 1:
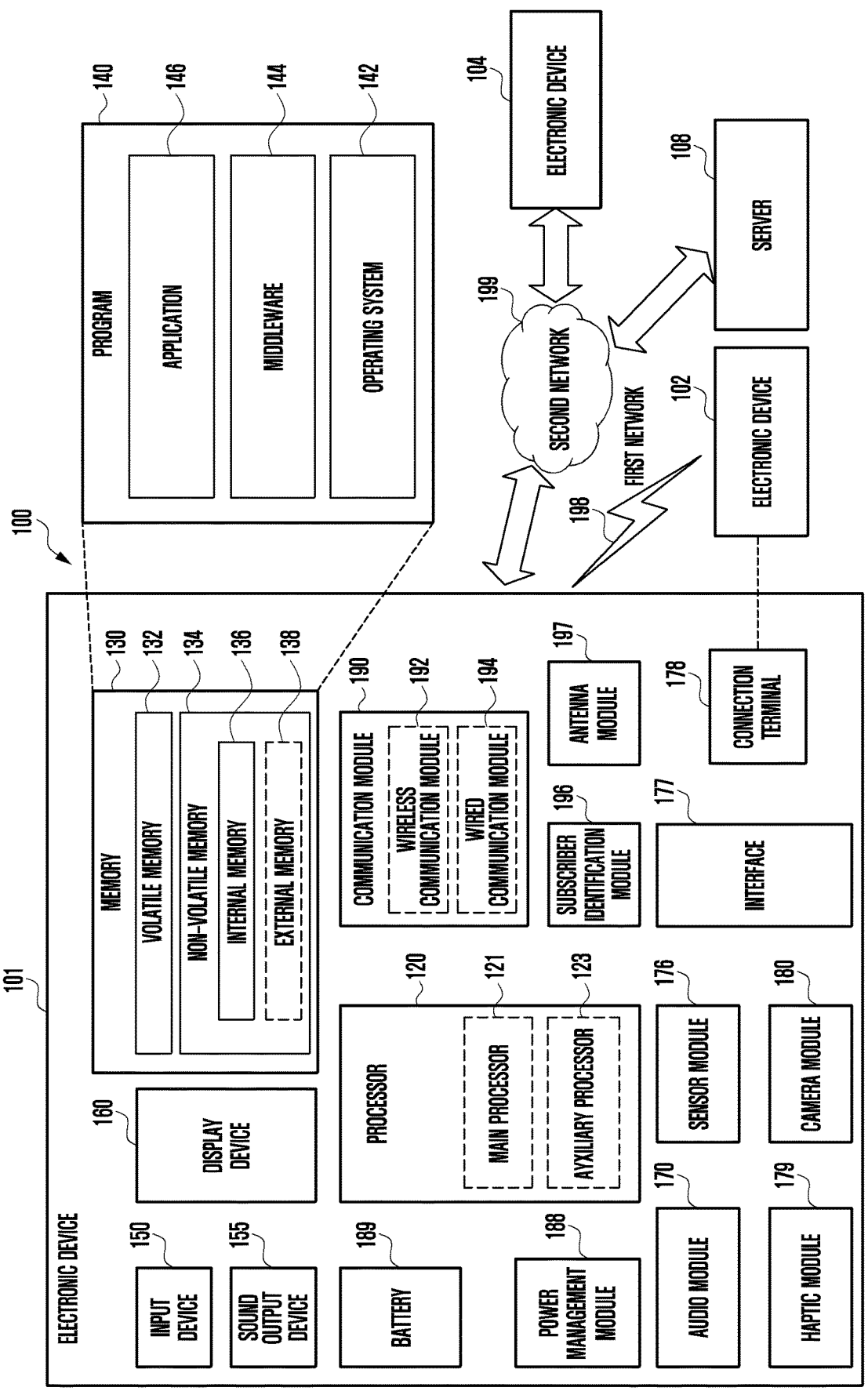
FIG. 1 is a block diagram illustrating an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

In various embodiments, an electronic device may provide a customized manual to a user so that the user can easily and conveniently use a preferring or familiar function.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
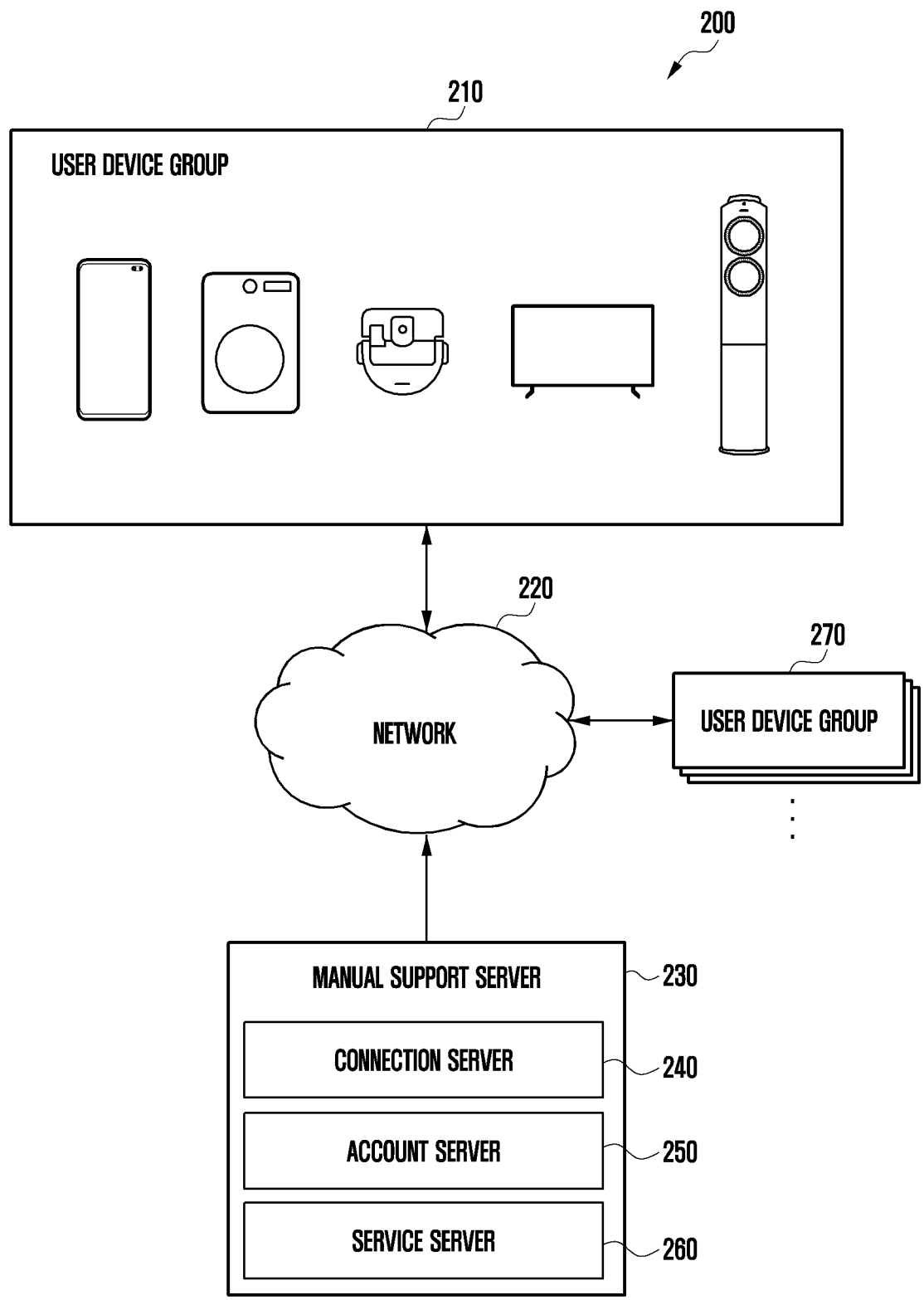
FIG. 2 illustrates a network environment configured to support a user-customized service, according to an embodiment.

FIG. 2 illustrates a network environment 200 configured to support a user-customized service, according to an embodiment.

Referring to FIG. 2, in the network environment 200, a user device group 210 may communicate with a manual support server 230 through a network 220. The manual support server 230 may also communicate with one or more other user device groups 270 through the network 220.

A user device, which participates in or is registered as a member of the user device group 210, may include one or more components identical with those of the electronic device 101 shown in FIG. 1 (e.g., the processor 120, the memory 130, the input device 150, the audio output device 155, the display device 160, the audio module 170, the sensor module 176, the communication module 190, and/or the antenna module 197).

The user device group 210 may include at least one mobile device (e.g., a smart phone), at least one computer device (e.g., a notebook PC or a desktop PC), and a plurality of home appliances (e.g., a washing machine, a robot cleaner, a refrigerator, a TV or an air conditioner), all of which will be commonly referred to as user devices hereinafter. At least one user device (e.g., a home appliance) in the user device group 210 may be located in a geographically designated area (e.g., home), and may be a shared device commonly used by members of a corresponding user group. The user devices in the group 210 may perform communication, for data transmission or remote control, with each other through an access point (AP) located in the area or by using peer-to-peer (P2P) communication technology (e.g., Wi-Fi Direct or Bluetooth). Also, the user devices in the group 210 may perform communication with each other through the network 220. For example, a processor of the mobile device may be configured to, using a wireless communication circuitry thereof, monitor an operating status of any other user device (e.g., a home appliance) in the group 210 and control, based on a monitoring result, the operation of the user device.

The user device in the group 210 may collect a usage history indicating the use of the user device group 210 by member(s) and provide it to the manual support server 230. Each of the user devices may collect the usage history during a given period of time and transmit it to the manual support server 230. The usage history may contain functional information indicating a particular function (or operation mode) performed in response to a user's manipulation (or remote control of any other user device), and setting information indicating a particular setting (or option) applied to such functions. For example, if the user device is a washing machine, the functional information may include standard wash, bedding wash, powerful wash, wool wash, or outdoor wash, and the setting information may include a water temperature, the number of rinses, or a spin-dry strength. If the user device is a TV, the functional information may include a standard mode, and the setting information may include backlight, brightness, contrast, or sharpness. If the user device is an electric stove, the functional information may include a turbo mode, and the setting information may include cooking zone, firepower, flex (e.g., using two cooing zones simultaneously), or lighting. If the user device is an air conditioner, the functional information may include a sleep mode, and the setting information may include driving time, wind direction, wind speed, or temperature.

The user device in the group 210 may collect a user profile (or personal information) and provide it to the manual support server 230. For example, the user device (e.g., a mobile device or a computer device) may receive the user profile (e.g., name, age, address, a relationship with other members, or account information) from the user through as an input device 150 or a touch-sensitive display 160. The user device may transmit the received user profile to the manual support server 230.

The user device in the group 210 may provide device information (e.g., a device type (e.g., a brand name or a model name), information on functions and settings, or a manual) to the manual support server 230. The manual may guide various functions of the device (e.g., a mobile device, a computer device, and a home appliance) to a user and/or help the user to manipulate or set such functions. The user device (e.g., a mobile device or a computer device) may display a screen for registering any electronic device as a new member of the group 210. The user device may recognize the presence of a new electronic device (e.g., a home appliance) (hereinafter, an unregistered device) not registered in the group 210 by scanning a wireless communication channel (e.g., a WiFi communication channel) through the wireless communication circuit, and display the identification information of the unregistered device on the registration screen. The user device may receive a user's selection of the unregistered device through the registration screen, and establish a wireless communication channel for communication with the selected unregistered device. The user device may receive device information from the unregistered device through the established wireless communication channel, and transmit the received device information to the manual support server 230 to register the unregistered device as a new member of the group 210 in the manual support server 230.

The manual support server 230 may be composed of a plurality of electronic devices that are physically or functionally separated. The manual support server 230 may include a connection server (or a relay server) 240, an account server 250, and a service server 260. At least one of the servers 240, 250, and 260 may include one or more components identical with those of the electronic device 101 shown in FIG. 1 (e.g., the processor 120, the memory 130, the communication module 190, and/or the antenna module 197). Additionally or alternatively, the servers 240, 250, and 260 may be configured in a module form (i.e., a connection module, an account module, and a service module), thus constructing one united server. A memory of the server may store instructions that cause, when executed by a processor of the server, the processor to perform the functions of the modules. In addition, the processor of the server may be configured to perform the functions of the modules. Additionally, the modules may be constructed as group-dedicated modules in any one of the user devices in the group 210. At least one of the user devices (e.g., a mobile device) in the group 210 may be configured to perform the same function(s) (e.g., an operation of generating a customized manual for a home appliance) as at least one of the functions of the modules. The processor of the mobile device may be configured to perform the above operation. In addition, the memory of the mobile device may store instructions that cause, when executed by the processor, the processor to perform the operation.

The connection server 240 may deliver data received from the user device group 210 to the account server 250 or the service server 260, and also deliver data received from the service server 260 to user devices of the user device group 210. For example, the connection server 240 may receive a registration request message containing device information from a user device and deliver the device information to the account server 250 and the service server 260. In addition, the connection server 240 may receive a usage history from a user device and deliver the usage history to the service server 260. The service server 260 may store the received usage history in a usage history database (DB). In addition, the connection server 240 may receive a customized manual and/or recommendation information from the service server 260 and deliver it to a user device. In addition, the connection server 240 may receive a user profile from a user device and deliver it to the account server 250.

The account server 250 may store, in a device information DB, device information of the user device group 210 received from a user device through the connection server 240. The account server 250 may store, in a user profile DB, a user profile received from a user device through the connection server 240. The account server 250 may store, in a user device profile DB, a user device profile received from the service server 260. As shown in Table 1, the user device profile may contain a user's usage type (or usage pattern) for a user device, a usage frequency (or preference) of a function related to the usage type, and a proficiency indicating a user's skillful handling of a function related to the usage type (or a difficulty level indicating a user's ease of using the function). The usage type may include items as shown in Table 2, shown below. Profiles classified for each user device may be combined into one profile. For example, the service server 260 may select profiles of the same category (e.g., a home appliance) from among user device profiles, calculate an average of preferences and an average of proficiencies for each usage type in the selected profiles, and determine the calculated averages as a preference and a proficiency for each usage type in the home appliance group profile.

TABLE 1

| Profile of user device 1 | Usage type 1 Preference Proficiency | Usage type 2 Preference Proficiency | ... | Usage type N Preference Proficiency |
|---|---|---|---|---|
| Profile of user device 2 | Usage type 1 Preference Proficiency | Usage type 2 Preference Proficiency | ... | Usage type N Preference Proficiency |
| ... | ... | ... | ... | ... |
| Profile of user device N | Usage type 1 Preference Proficiency | Usage type 2 Preference Proficiency | ... | Usage type N Preference Proficiency |
| Group profile | Usage type 1 Preference (avg.) Proficiency (avg.) | Usage type 2 Preference (avg.) Proficiency (avg.) | ... | Usage type N Preference (avg.) Proficiency (avg.) |

TABLE 2

| | Usage type | Description | Related functions (example) |
|---|---|---|---|
| Device | Setting personalization | Users prefer to set their own way of use. | My favorite |
| | Manipulation change | Users prefer to change setting other than default mode/operation values. | Option change |
| Location | Remote control | Users prefer to use a device remotely. | Remote monitoring |
| Time | Notification | Users prefer to receive information from a device in a desired condition. | Notification 5 minutes before completion |
| | Schedule setting | Users prefer to operate a device at a desired time. | Delay end (Scheduled cleaning) |
| Person | Share | Users prefer to share device's permissions or usage history with others. | Neighborhood energy use rate |
| Service | Function extension | Users prefer to use other functions in addition to default functions of a device. | service card |

The service server 260 may generate a customized manual for a newly registered user device (e.g., a device of the same or different type as the existing user device) and/or recommendation information for recommending the manual to a user, based on the usage history or group profile of the existing user device (e.g., a home appliance). For example, the service server 260 may generate the customized manual and/or recommendation information by extracting apart matched with a group profile from the entire manual of the new user device. The matched part may be a manual for a function corresponding to a usage type with the highest preference, or a manual for an unused sub-function in a function corresponding to a certain level of proficiency (e.g., a high level among low, medium, and high levels). The service server 260 may transmit the generated customized manual and/or recommendation information to the user device (e.g., a newly registered user device or mobile device) through the connection server 240. The operation of generating the customized manual and/or recommendation information may be performed by one (e.g., a mobile device) of members of the user device group 210.

The service server 260 may update a user device profile (or group profile), based on the usage history of the user device, and store the updated profile in the account server 250. The service server 260 may determine a user device's function matched with the updated profile and/or a setting necessary for performing the function and, based on the determined function and/or setting, update the customized manual and/or recommendation information for the user device. The operation of updating the customized manual and/or recommendation information may be performed by one (e.g., a mobile device) of the members of the user device group 210.

Figure 3:
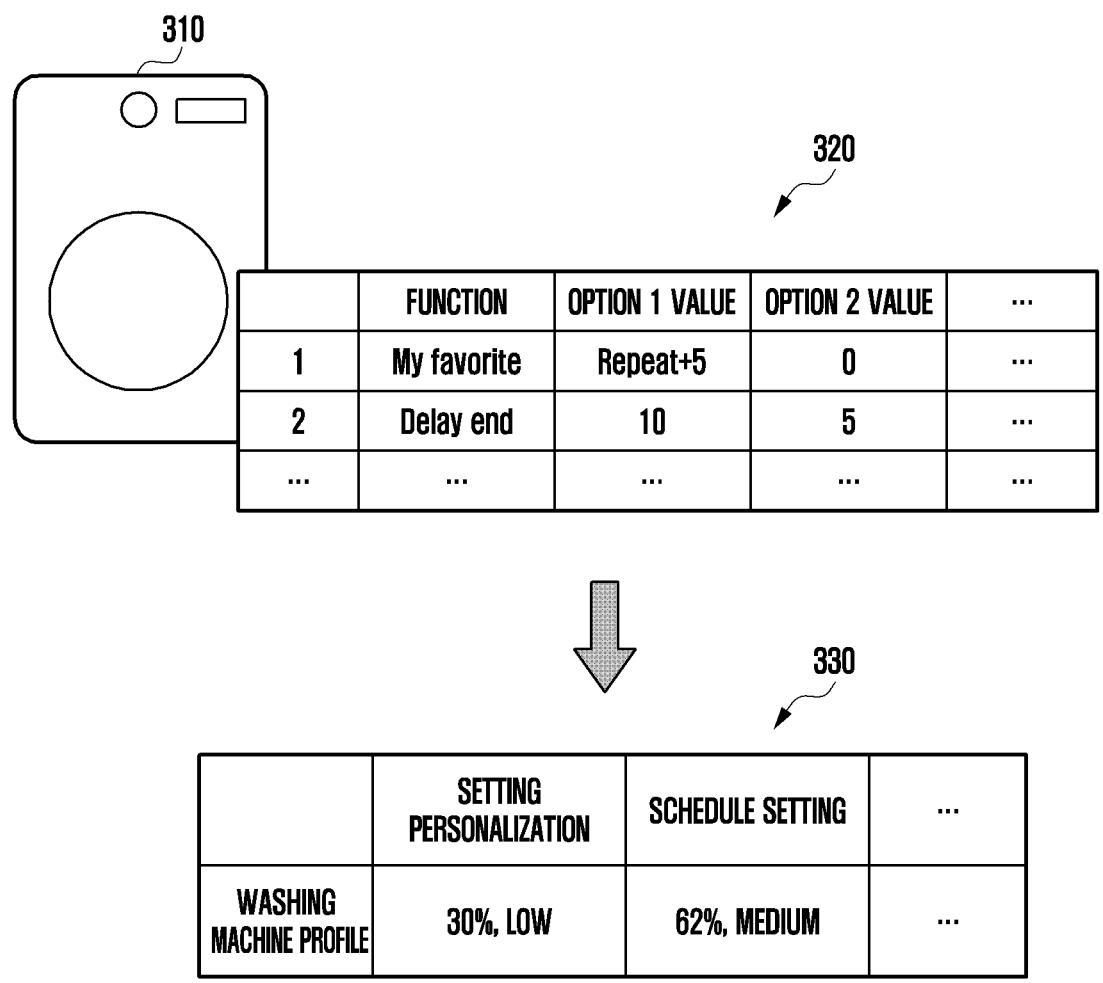
FIG. 3 is a diagram illustrating an operation of generating a profile of a washing machine that is a member of the group, according to an embodiment.

FIG. 3 is a diagram illustrating an operation of generating a profile of a washing machine that is a member of the group 210, according to an embodiment.

Referring to FIG. 3, the generating operation may be performed by a processor of the service server 260, the washing machine or a processor of another user device (e.g., a mobile device) in the group 210.

The processor may collect a usage history 320 for each function (e.g., a "my favorite" function or a delay end function) of the washing machine 310. Then, based on the usage history 320 collected during a given period of time, the processor may generate a washing machine profile 330.

The processor may count the number of times each function has been used based on the collected usage history, and assign a weight (preference) to a usage type related to each function based on the counted number. For example, the processor may assign a weight of 30% to the usage type "setting personalization" related to the function "my favorite", assign a weight of 62% to the usage type "schedule settings" related to the function "delay end", and assign the remaining weight of 8% to other usage types. In this case, the processor may recognize that in the group 210 the washing machine is mainly used as the usage type "schedule settings" and secondly used as the usage type "setting personalization".

The processor may count the number of settings (e.g., rinse, spin-dry, water or temperature) for each function or the number of user manipulations to set each function based on the collected usage history, and determine a proficiency for a usage type related to each function based on the counted number. For example, the processor may determine the proficiency for the usage type "setting personalization" related to the function "my favorite" as a "low" level, and determine the proficiency for the usage type "schedule settings" related to the function "delay end" as a "medium" level.

Figure 4:
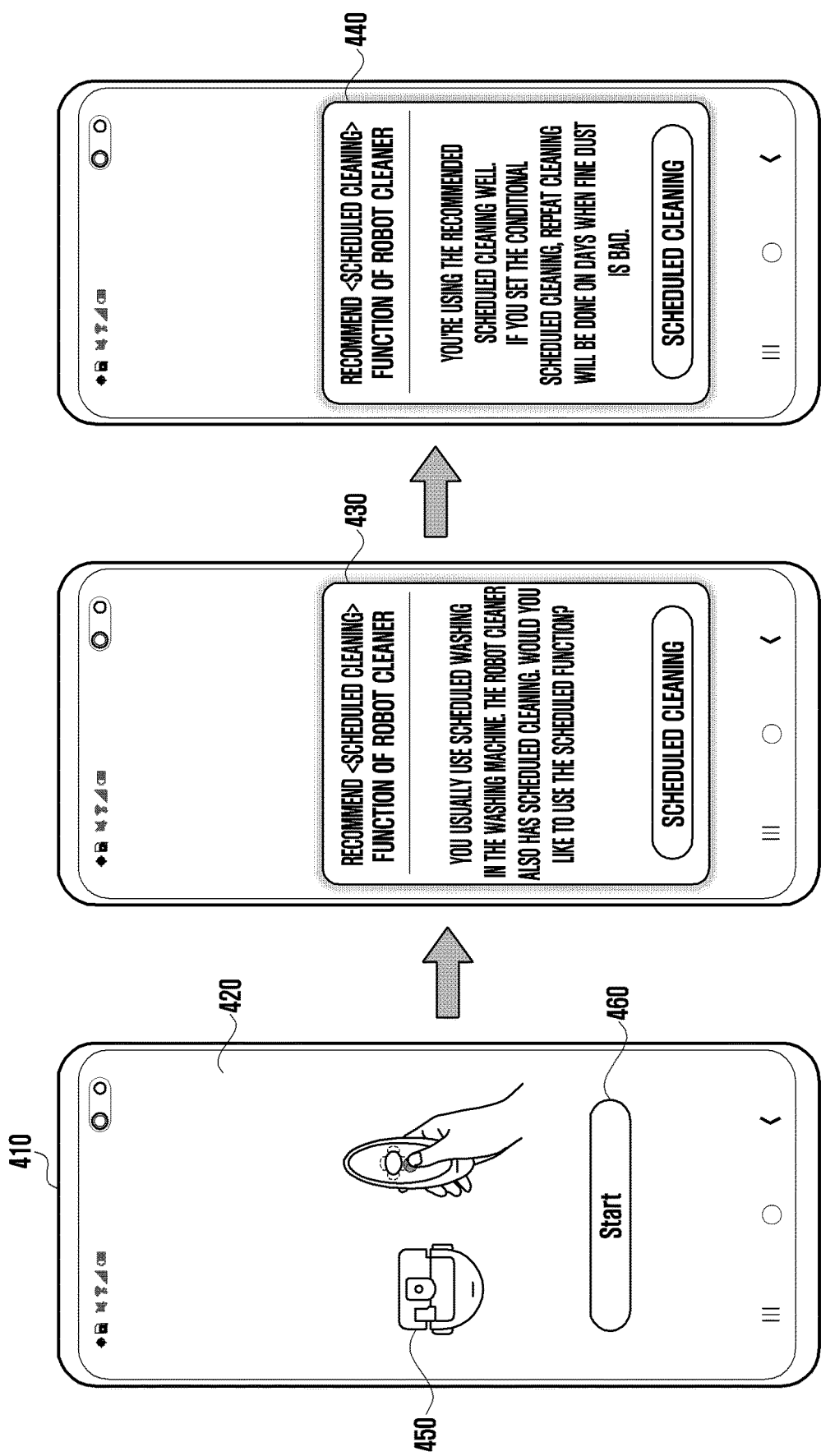
FIG. 4 is a diagram illustrating an operation of recommending a function of a user device based on a group profile, according to an embodiment.

FIG. 4 is a diagram illustrating an operation of recommending a function of a user device based on a group profile, according to an embodiment.

Referring to FIG. 4, a procedure of registering an unregistered device as a member of the group 210 may be started through a registration screen 420 of a first user device 410 (e.g., a mobile device) in the group 210. As a result of registration, first recommendation information 430 may be provided through a display. Also, when a group profile is updated, second recommendation information 440 may be provided through the display.

A processor of the first user device 410 may recognize the existence of an unregistered device, e.g., a robot cleaner, by using a wireless communication circuit. The processor may visually provide a user with identification information 450 and a registration request button 460 on the registration screen 420. The processor may perform the procedure of registering an unregistered device as a member of the group 210 in response to a user input on the registration request button 460.

The processor of the first user device 410 may visually provide the first recommendation information 430 as a result of registration through the display.

The processor of the service server 260 may receive device information of a second user device (e.g., a robot cleaner) from the first user device 410 through the connection server 240. The processor of the service server 260 may compare the received device information with device information of the user device group 210 (e.g., device information stored in the account server 250), and thereby recognize that the second user device is different from the existing user devices in the group 210. Based on this recognition, as shown in Table 3, below, the processor of the service server 260 may identify a preference and a proficiency corresponding to each usage type from a group profile (e.g., the group profile stored in the account server 250). In addition, the processor of the service server 260 may classify functions of the second user device according to the usage type as shown in Table 3. Based on such identifying and classifying results, the processor of the service server 260 may determine that the user will most preferentially and skillfully handle the scheduled cleaning among the functions of the second user device, and then determine the scheduled cleaning as a first recommended function. The processor of the service server 260 may transmit information on the first recommended function to the first user device 410 through the connection server 240. The processor of the first user device 410 may visually provide the received first recommendation information 430 through the display.

TABLE 3

| Usage type | Preference | Proficiency | Function of 2nd user device |
| --- | --- | --- | --- |
| Manipulation change | 3% | Low | Powerful cleaning |
| Remote control | 30% | Low | Use of remote controller |
| Schedule setting | 62% | Medium | Scheduled cleaning |
| ... | | ... | ... |

The processor of the first user device 410 may be configured to perform the above-described operations of identifying the preference/proficiency, classifying the functions of the second user device according to the usage type, and determining the first recommended function.

When the group profile is updated, the processor of the first user device 410 may visually provide the second recommendation information 440 through the display.

The processor of the service server 260 may receive a usage history of a user device (e.g., the second user device) through the connection server 240. The processor of the service server 260 may update the group profile, based on the received usage history. For example, based on the usage history, the processor of the service server 260 may adjust upwards the proficiency of the schedule setting to a high level as shown in Table 4, below. In another example, based on the usage history, the processor of the service server 260 may adjust upwards the preference of the schedule setting. Based on such upward adjustment, the processor of the service server 260 may generate recommendation information for a function related to a usage type in which the proficiency and/or preference is adjusted upwards. For example, referring to Table 4, below, the processor may recognize that the usage type whose proficiency is adjusted upwards to a certain level or higher is the schedule setting, and then recognize that the function of the second user device related to the schedule setting is the scheduled cleaning. In another example, the processor may recognize the function of the second user device corresponding to the usage type whose preference is adjusted upwards to a certain level or higher. As a result, based on the user's proficiency and/or preference for the recognized function being adjusted upwards to a certain level or higher, the processor may determine a sub-function of that function as a second recommended function. For example, the processor may recognize, based on the usage history of the user device, that a conditional scheduled cleaning (e.g., a function to schedule cleaning to be performed repeatedly when fine dust is high) has never been used as a sub-function of the scheduled cleaning, and thereby determine the conditional scheduled cleaning as the second recommended function. The processor of the service server 260 may transmit information on the second recommended function to the first user device 410 through the connection server 240. The processor of the first user device 410 may visually provide the received second recommendation information 440 through the display.

TABLE 4

| Usage type | Preference | Proficiency | Function of 2nd user device |
| --- | --- | --- | --- |
| Manipulation change | 3% | Low | Powerful cleaning |
| Remote control | 30% | Low | Use of remote controller |
| Schedule setting | 62% | High | Scheduled cleaning (Conditional scheduled cleaning) |
| ... | | ... | ... |

The processor of the first user device 410 may be configured to perform the above-described operation of determining the second recommended function based on the update of the group profile.

The registration screen 420, the first recommendation information 430, and/or the second recommendation information 440 may be provided to the user through the display of the second user device.

Figure 5:
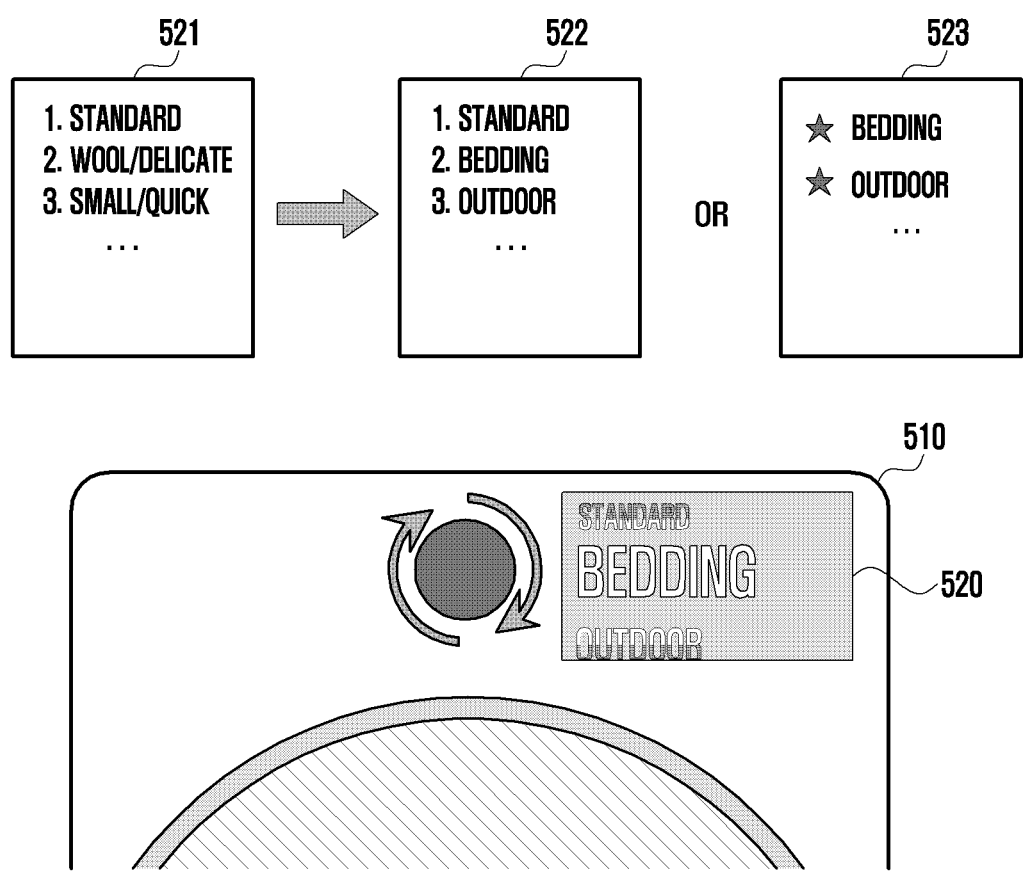
FIG. 5 is a diagram illustrating an operation of recommending a function of a user device based on a usage history, according to an embodiment.

FIG. 5 is a diagram illustrating an operation of recommending a function of a user device, based on a usage history, according to an embodiment.

Referring to FIG. 5, a first user device 510 (e.g., a washing machine) may provide a first customized manual 522 and/or a second customized manual 523, instead of a default manual 521, through a setting screen 520.

The processor of the first user device 510 may visually provide, through the setting screen 520, the first customized manual 522 and/or the second customized manual 523 as a result of the first user device 510 being registered as a member of the group 210.

The processor of the service server 260 may receive information of the first user device 510 from the first user device 510 or a second user device (e.g., a mobile device) in the group 210. The processor may compare the received device information with device information of the user device group 210 (e.g., device information stored in the account server 250), and thereby recognize that a third user device of the same type as the first user device 510 exists in the group 210. Based on this recognition, as shown in Table 5, below, the processor of the service server 260 may classify the functions of the third user device in the order of use frequency by using the usage history of the second user device. The processor of the service server 260 may select functions of the first user device 510 matched with functions of a predetermined rank (e.g., a third rank) or higher among functions of the third user device.

Referring to Tables 5 and 6, below, the processor may select, as a function to be provided through a customized manual, a function (e.g., a standard washing function) of the first user device 510 having the same setting values as those of the standard washing function, which is classified as the first rank, among functions of the third user device. Also, the processor may select, as another function to be provided through the customized manual, a function (e.g., a bedding wash function) of the first user device 510 having the same setting values as those of the bedding wash function classified as the second rank. Also, the processor may select, as another function to be provided through the customized manual, a function (e.g., an outdoor wash function) of the first user device 510 having the same setting values as those of the random wash function classified as the third rank. The processor of the service server 260 may generate recommendation information containing item(s) indicating at least one of the selected functions. For example, the processor may change the default manual 521 to a customized default manual 522 that contains items (e.g., standard, bedding, or outdoor) of the selected functions. The processor may generate a customized favorite manual 523 that contains specific items (e.g., bedding or outdoor). Additionally, the processor may generate information for informing the user that two functions are different only in their names and have the same setting values. For example, the processor may generate information for notifying the user that the outdoor wash and the random wash have the same setting values except for their names. The processor of the service server 260 may transmit the customized manual(s) 522 and/or 523 to the first user device 510 and/or the second user device, thereby allowing the user to manipulate (or remotely manipulate) the first user device 510 by using the customized manual. For example, the first customized manual 522 and/or the second customized manual 523 may be recommended to the user through the display of the user device. If a user input of accepting the recommendation is recognized through the input device 150 or the touch-sensitive display 160 of the user device, the first customized manual 522 and/or the second customized manual 523 may be provided to the user as a manual for allowing the user to manipulate the first user device.

TABLE 5

| Frequency rank | Function | Water temp. | Number of rinses | Spin-dry strength |
|---|---|---|---|---|
| 1 | Standard wash | 40 | 3 | Strong |
| 2 | Bedding wash | 30 | 3 | Strong |
| 3 | Random wash | 30 | 2 | Medium |
| ... | ... | ... | ... | ... |

TABLE 6

| Function | Water temp. | Number of rinses | Spin-dry strength |
|---|---|---|---|
| Standard wash | 40 | 3 | Strong |
| Bedding wash | 30 | 3 | Strong |
| Outdoor wash | 30 | 2 | Medium |
| ... | ... | ... | ... |

The processor of the first user device 510 or the processor of the second user device may be configured to perform operations of classifying functions of the third user device in the order of use frequency by using the usage history of the second user device, selecting functions of the first user device 510 matched with functions of a certain rank or higher among functions of the third user device, and generating a customized manual containing item(s) indicating at least one of the selected functions.

Figure 6:
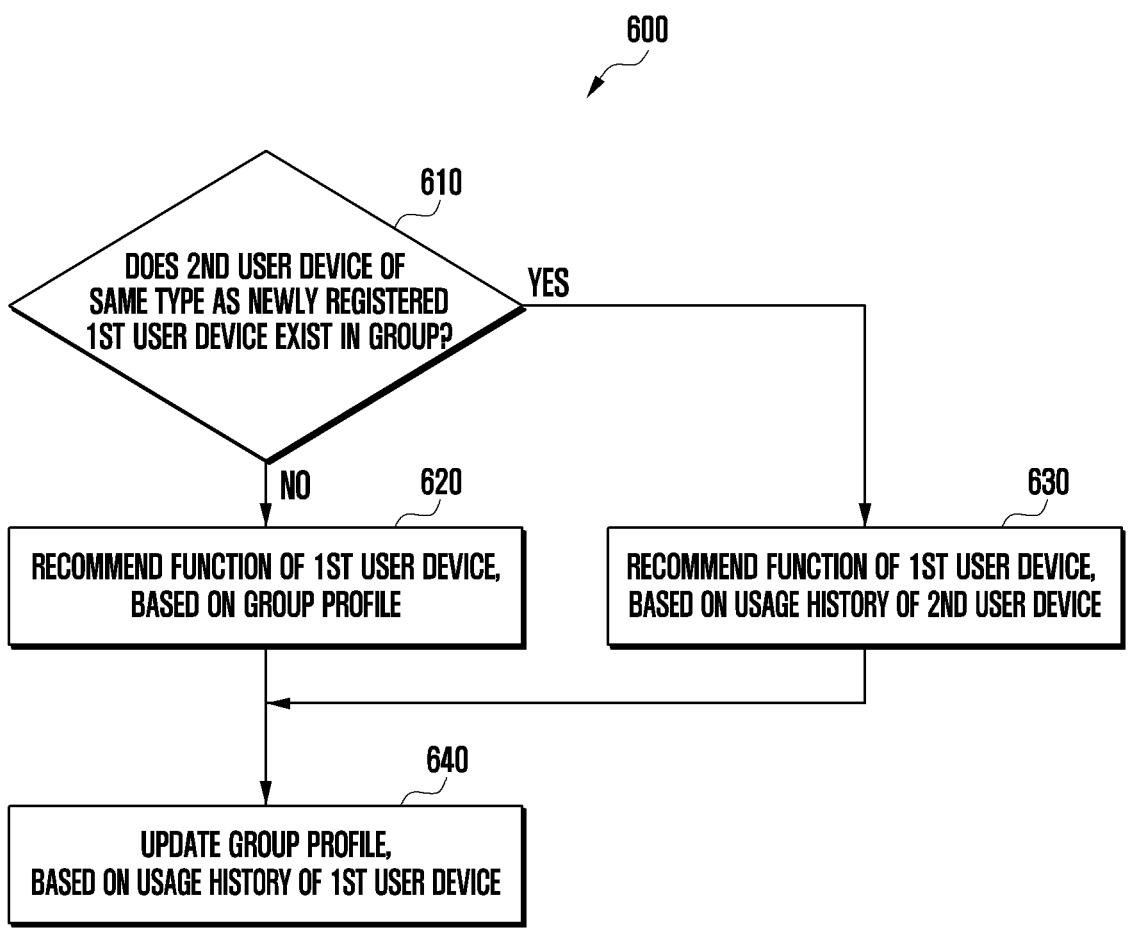
FIG. 6 is a flow diagram illustrating operations of supporting a customized manual, according to an embodiment.

FIG. 6 is a flow diagram illustrating operations 600 for supporting a customized manual, according to an embodiment.

Referring to FIG. 6, the operations 600 may be performed by a processor of the manual support server 230 or the service server 260, or by a processor of a user device in the group 210 (e.g., a processor of a mobile device) when a new electronic device is registered as a member of the group 210.

At operation 610, the processor determines whether a second user device (a previously registered electronic device) of the same type as a first user device (a newly registered electronic device) exists in the group 210. For example, when device information of the first user device is found in the device information DB or the user device profile DB of the user device group 210, the processor may determine that the same-type second user device exists in the group 210. Also, when it is not found in the DB, the processor may determine that the same-type second user device does not exist in the group 210.

When it is determined that the same-type second user device does not exist in the group 210 (i.e., NO branch of operation 610), the processor performs operation 620 and recommends a function of the first user device (e.g., the operation of providing information on the first recommended function to the user in the above-described process of FIG. 4), based on the group profile. When it is determined that the same-type second user device exists in the group 210 (i.e., YES branch of operation 610), the processor performs operation 630 and recommends a function of the first user device (e.g., the operation of recommending the customized manual to the user in the above-described process of FIG. 5), based on the usage history of the second user device.

The information on the recommended function may be visually provided through a display of a user device. If a user input of accepting recommendation is received through an input device 150 or a touch-sensitive display 160 of the user device as a user's response to the recommendation, an item indicating the recommended function may be applied to a customized manual of the first user device.

At operation 640, the processor collects the usage history generated when the first user device is used by the user(s), and updates the group profile by using the collected usage history.

Figure 7:
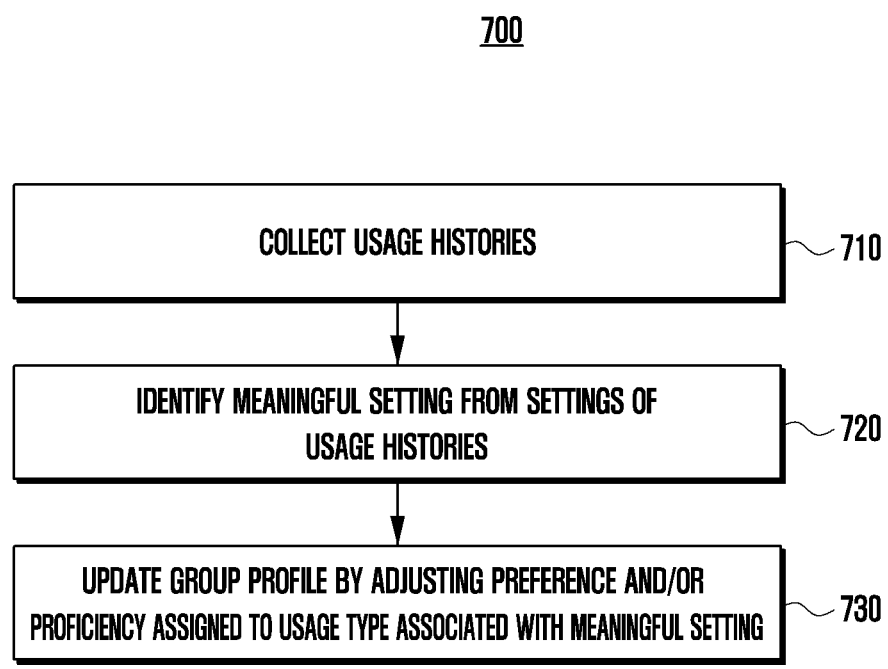
FIG. 7 is a flow diagram illustrating operations of updating a group profile based on a usage history, according to an embodiment.

FIG. 7 is a flow diagram illustrating operations 700 for updating a group profile, based on a usage history, according to an embodiment.

Referring to FIG. 7, the operations 700 may be performed by a processor of the manual support server 230, a processor of the service server 260, a processor of a user device in the group 210, or a processor of a mobile device.

At operation 710, the processor collects usage histories as shown in Table 7, below, from the user device in the group 210. In Table 7, the value "N–M" (N=1, 2, 3, ... and M=1, 2, 3, ...) may indicate whether the user has used a particular function to which the corresponding setting is applied (e.g., whether an alarm has been used) or whether the user has manipulated (or changed) the corresponding setting (e.g., whether the number of rinses has been increased).

TABLE 7

|  | Setting 1 | Setting 2 | ... | Setting N |
|---|---|---|---|---|
| Usage history 1 | Value 1-1 | Value 2-1 | ... | Value N-1 |
| Usage history 2 | Value 1-2 | Value 2-2 | ... | Value N-2 |
| Usage history 3 | Value 1-3 | Value 2-3 | ... | Value N-3 |
| ... | ... | ... | ... | ... |
| Usage history M | Value 1-M | Value 2-M | ... | Value N-M |

At operation 720, the processor identifies a meaningful setting from settings of the collected usage histories (1, 2, ..., and N). The meaningful setting may refer to a setting that has a usage frequency greater than or equal to a predetermined threshold. For example, the processor may calculate a sum of values assigned to each setting, and regard a certain setting having the sum greater than or equal to the threshold as the meaningful setting.

At operation 730, the processor updates the group profile by adjusting upwards the preference and/or proficiency assigned to the usage type associated with the meaningful setting from among the usage types of the group profile.

Figure 8:
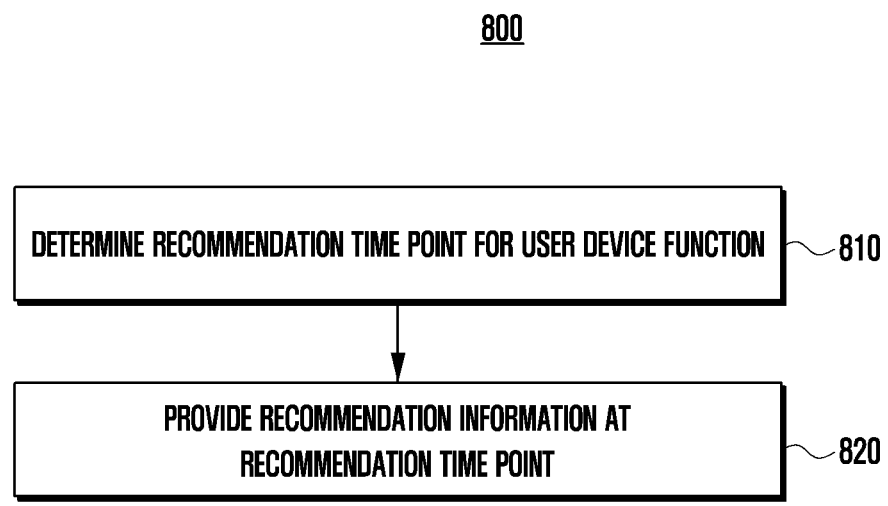
FIG. 8 is a flow diagram illustrating operations of recommending a function based on a usage type, according to an embodiment.

FIG. 8 is a flow diagram illustrating operations 800 for recommending a function based on a usage type, according to an embodiment.

Referring to FIG. 8, the operations 800 may be performed by a processor of the manual support server 230, a processor of the service server 260, a processor of a user device in the group 210, or a processor of a mobile device.

At operation 810, the processor determines a recommendation time point for a user device function determined to be recommended to the user. As shown in Table 8, below, the memory may store information indicating a relationship among a usage type, a user device type, a user device function, and a recommendation time point. Based on this information stored in the memory, the processor may determine the recommendation time point. For example, the processor may recognize, from the above information, the recommendation time point that corresponds to the user device and its function (e.g., remote preheating of an oven). In another example, the processor may recognize, from the above information, there commendation time point corresponding to a different particular function (e.g., "my favorite" function or personalization of main functions). The recommendation time point may refer to "initial" (when the user device is registered as a member of the group 210 and used for the first time by the user), "before use" (when the user device is not yet used), "in use" (when the user device is in use), or "after use" (after the user device is used).

TABLE 8

| Usage type | Initial | Before use | In use | After use |
|---|---|---|---|---|
| Setting personalization | Personalization of main functions |  |  | My favorite function |
| Manipulation change |  | Robot cleaner, Spot cleaning mode setting | Washing machine, Add-wash deadline notice |  |
| Remote control |  | Oven remote preheating | Washing machine remote monitoring |  |
| Notification |  | Air dresser, Fine dust notification |  | Washing machine, Personalized notification setting |
| Schedule setting |  |  |  | Washing machine, Notification of laundry collection |
| Share |  | Friends' usage top 3 |  |  |
| Function extension |  | Air Dresser, Download course |  | Air Dresser, Accessories introduction |

At operation 820, the processor provides recommendation information to the user at the determined recommendation time point. The processor of the service server 260 may transmit information indicating the recommendation time point to a remote control device (e.g., a mobile device) in the group 210 so that the recommendation information is displayed through a display of the remote control device at the recommendation time point. The processor of the service server 260 may transmit the recommendation time point information to a user device to perform the corresponding recommended function so that the recommendation information is displayed through a display of the user device at the recommendation time point. A processor of the remote control device may display the recommendation information through the display thereof at the recommendation time point.

Figure 9A:
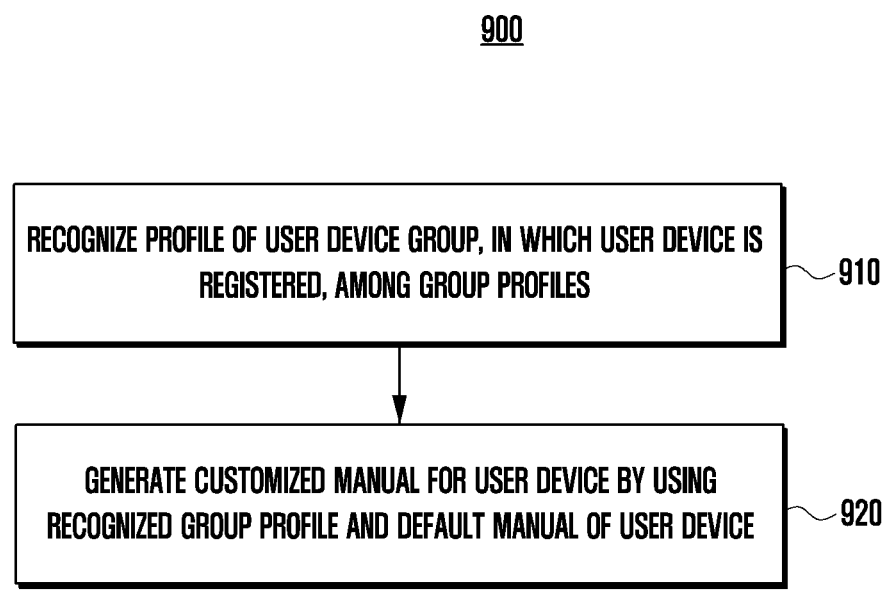
FIG. 9A is a flow diagram illustrating operations of generating a customized manual based on a group profile, according to an embodiment.
Figure 9B:
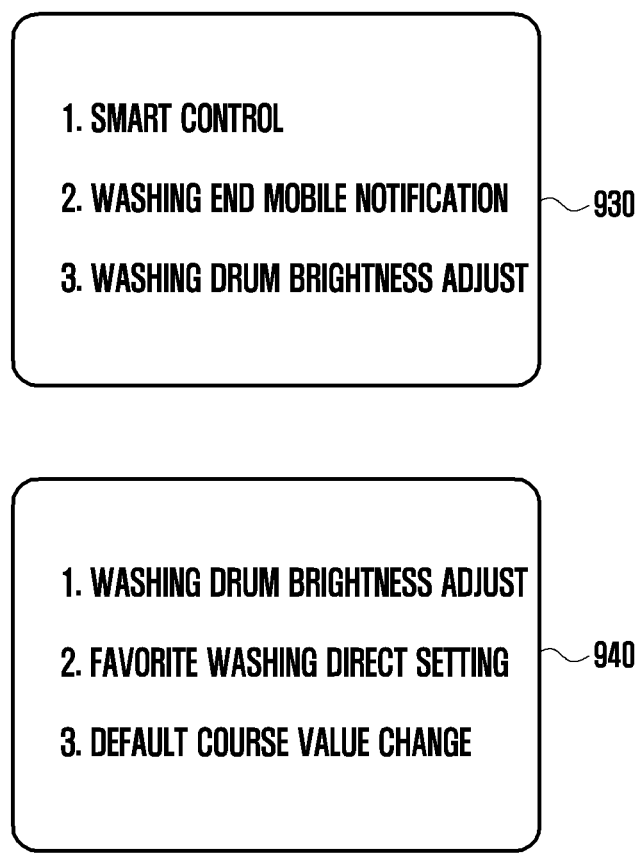
FIG. 9B is a diagram illustrating examples of a customized manual, according to an embodiment.

FIG. 9A is a flow diagram illustrating operations 900 for generating a customized manual based on a group profile, according to an embodiment. FIG. 9B is a diagram illustrating examples of a customized manual, according to an embodiment.

Referring to FIG. 9A, the operations 900 may be performed by a processor of the manual support server 230 or a processor of the service server 260.

At operation 910, the processor recognizes a profile of a user device group, in which a user device is registered, among a plurality of group profiles. The manual support server 230 or the account server 250 may store a plurality of user device group profiles as shown in Table 9, below. From among the user device group profiles, the processor may recognize a profile of a group 210 in which the user device is registered.

TABLE 9

|  | Setting personalization | Remote control | ... |
|---|---|---|---|
| Group profile of 1$^{st}$ user device group | 30%, Low | 62%, High | ... |
| Group profile of 2$^{nd}$ user device group | 80%, High | 5%, Low | ... |
| ... | ... | ... | ... |

At operation 920, the processor generates a customized manual for the user device by using the recognized group profile and a default manual of the user device.

The processor may generate the customized manual by adjusting the order of function items of the default manual so that a function item corresponding to a usage type having a higher preference is preferentially disposed higher than a function item corresponding to a usage type having a lower preference. For example, referring to Table 9 and FIG. 9B, if the user device belongs to a first user device group, the processor may generate a first customized manual 930 for the user(s) of the first user device group by preferentially disposing a function item (e.g., smart control or washing end mobile notification) corresponding to the remote control over a function item (e.g., washing drum brightness adjust) corresponding to the setting personalization. If the user device belongs to a second user device group, the processor may generate a second customized manual 940 for the user(s) of the second user device group by preferentially disposing a function item (e.g., washing drum brightness adjust, favorite washing direct setting, or default course value change) corresponding to the setting personalization.

The processor may generate the customized manual by adjusting the order of function items of the default manual so that a function item having a low proficiency is preferentially disposed over a function item having a high proficiency. Even if function items belong to the same usage type, individual functions may be contained with different proficiencies in the group profile. Referring to the second customized manual 940, the processor may arrange function items corresponding to the setting personalization in the manual in an order from a low proficiency to a high proficiency.

Figure 10A:
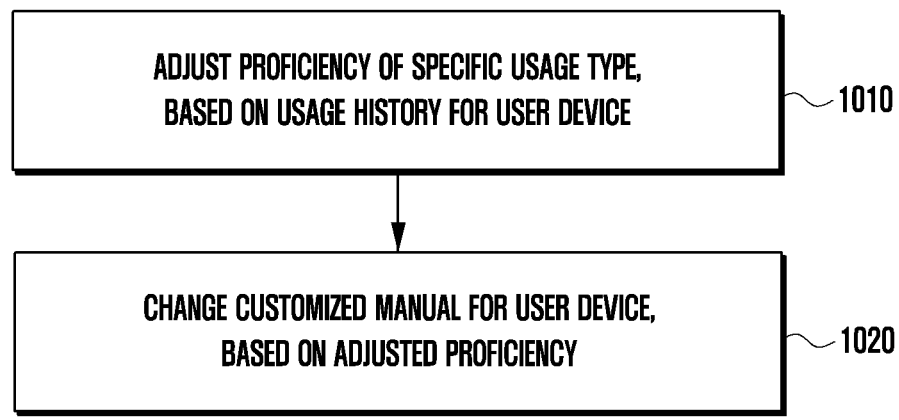
FIG. 10A is a flow diagram illustrating operations of changing a customized manual based on an update of a group profile, according to an embodiment.
Figure 10B:
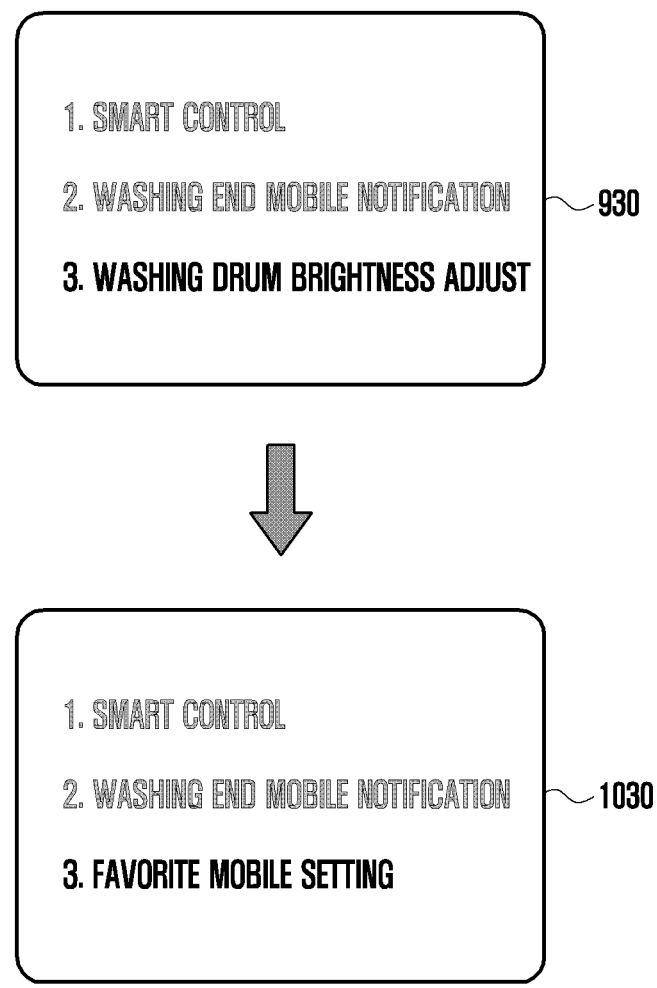
FIG. 10B is a diagram illustrating examples of a customized manual before and after a change, according to an embodiment.

FIG. 10A is a flow diagram illustrating operations 1000 for changing a customized manual based on an update of a group profile, according to an embodiment. FIG. 10B is a diagram illustrating examples of a customized manual before and after a change, according to an embodiment.

Referring to FIG. 10A, the operations 1000 may be performed by a processor of the manual support server 230 or a processor of the service server 260.

At operation 1010, the processor adjusts the proficiency of a specific usage type based on a usage history for the user device. For example, referring to Table 9, above, and Table 10, below, the processor may adjust upwards the proficiency of the setting personalization from a "medium" level to a "high" level in the group profile of the first user device group and/or the second user device group.

TABLE 10

|  | Setting personalization | Remote control | ... |
|---|---|---|---|
| Group profile of 1$^{st}$ user device group | 30%, Medium | 62%, High | ... |
| Group profile of 2$^{nd}$ user device group | 80%, High | 5%, Low | ... |
| ... | ... | ... | ... |

At operation 1020, the processor changes the customized manual for the user device based on the adjusted proficiency. For example, the processor may generate a third customized manual 1030 by changing "washing drum brightness adjust" to correspond to a "low" proficiency level, designated as the third item in the first customized manual 930, by changing it to "favorite mobile setting" corresponding to a "middle" proficiency level.

Figure 11A:
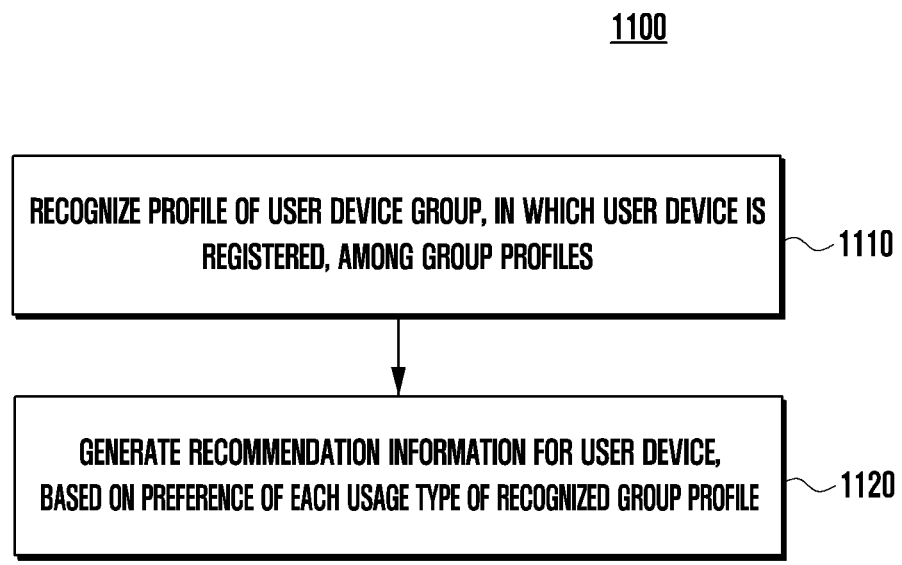
FIG. 11A is a flow diagram illustrating operations of generating recommendation information based on a preference of a usage type, according to an embodiment.
Figure 11B:
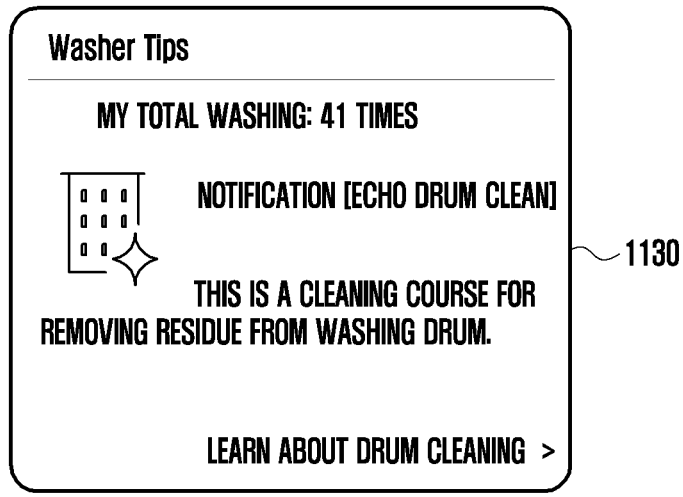
FIG. 11B is a diagram illustrating examples of recommendation information provided differently to a user depending on preferences, according to an embodiment.
Figure 11B:
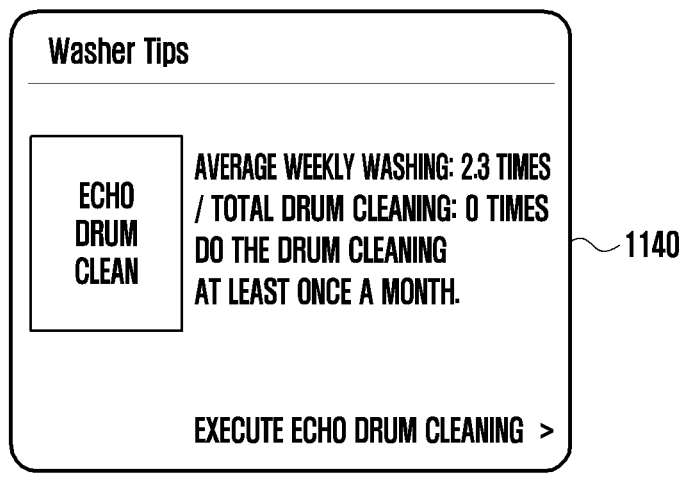
Figure 11B:
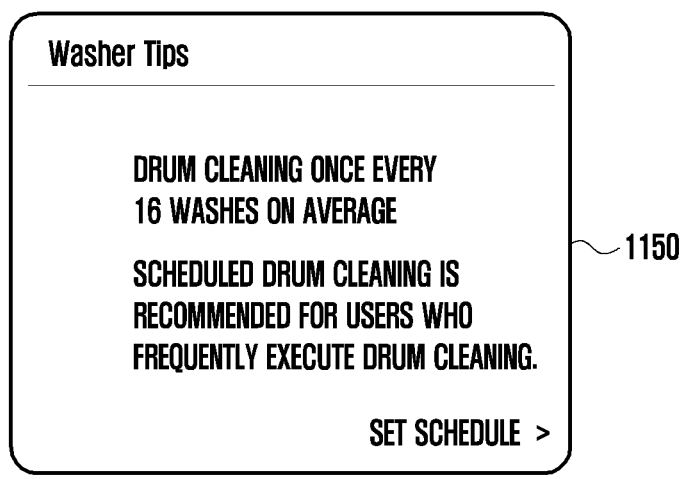

FIG. 11A is a flow diagram illustrating operations 1100 for generating recommendation information based on a preference of a usage type, according to an embodiment. FIG. 11B is a diagram illustrating examples of recommendation information provided differently to a user depending on preferences, according to an embodiment.

Referring to FIG. 11A, the operations 1100 may be performed by a processor of the manual support server 230 or a processor of the service server 260.

At operation 1110, the processor recognizes a profile of a user device group, in which a user device is registered, among a plurality of group profiles. For example, the manual support server 230 or the account server 250 may store a plurality of user device group profiles as shown in Table 11, below. From among the user device group profiles, the processor may recognize a profile of a group 210 in which the user device is registered.

TABLE 11

|  | Setting personalization | Remote control | Notification | Schedule setting | ... |
|---|---|---|---|---|---|
| Group profile of 1$^{st}$ user device group |  |  | 78% |  | ... |

TABLE 11-continued

|  | Setting personalization | Remote control | Notification | Schedule setting | ... |
|---|---|---|---|---|---|
| Group profile of 2nd user device group |  | 41% | 32% |  | ... |
| Group profile of 3rd user device group | 23% |  | 19% | 21% | ... |
| ... | ... | ... | ... | ... | ... |

At operation 1120, the processor generates recommendation information for the user device based on the preference of each usage type of the recognized group profile. The processor may select at least one usage type having a relatively high preference from among usage types (e.g., from among usage types shown in Table 2), and generate the recommendation information for functions related to the selected at least one usage type.

Referring to Table 11, above, and FIG. 11B, the processor may generate the recommendation information for a specific function (e.g., a so-called "echo drum clean", which means a function of cleaning a washing drum without detergent) of the user device. If the user device belongs to the first user device group, the processor may recognize from the first user device group profile that the notification has the highest preference among various usage types, and thereby generate first recommendation information 1130 for specifically informing the user what the specific function (e.g., the echo drum clean) is. If the user device belongs to the second user device group, the processor may recognize that the remote control and the notification have relatively higher preferences over the other usage types, and thereby generate second recommendation information 1140 for specifically informing the user what the specific function is and that the remote control is available. If the user device belongs to the third user device group, the processor may recognize that the setting personalization, the notification, and the schedule setting have relatively higher preferences over the other usage types, and thereby generate third recommendation information 1150 for specifically informing the user what the specific function is and that a scheduled and personalized setting is possible.

Figure 12A:
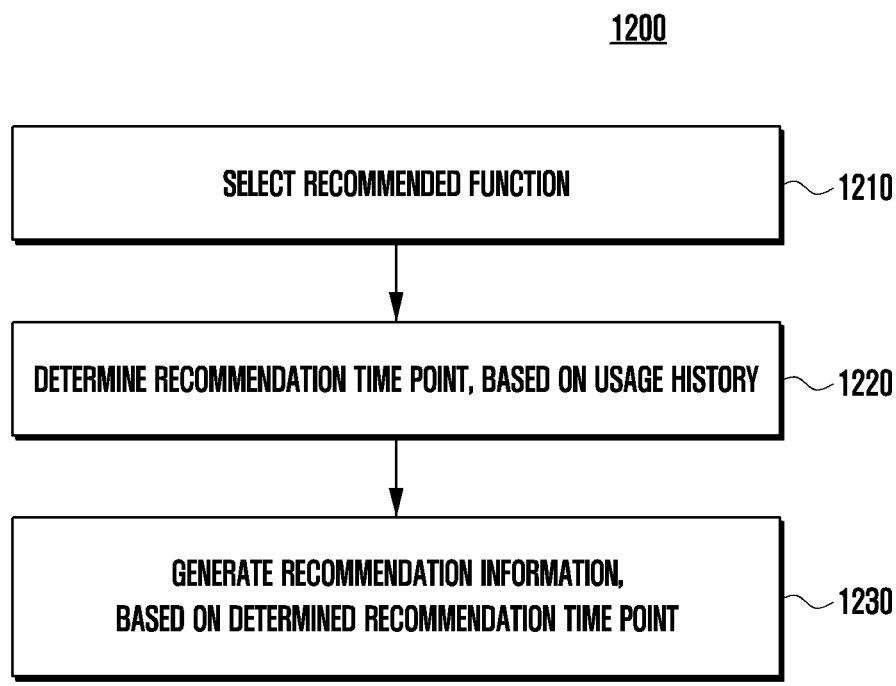
FIG. 12A is a flow diagram illustrating operations of generating recommendation information based on a recommendation time point, according to an embodiment.
Figure 12B:
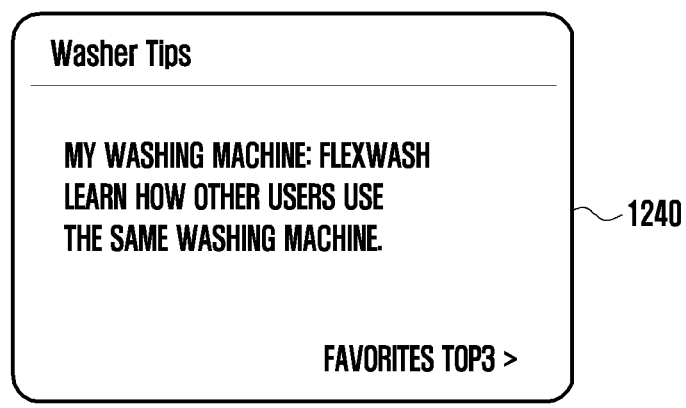
FIG. 12B is a diagram illustrating examples of recommendation information provided differently to a user depending on recommendation time points, according to an embodiment.
Figure 12B:
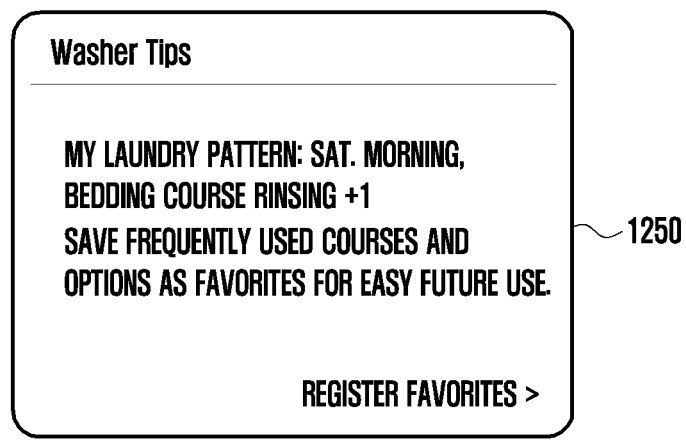

FIG. 12A is a flow diagram illustrating operations 1200 for generating recommendation information, based on a recommendation time point, according to an embodiment. FIG. 12B is a diagram illustrating examples of recommendation information provided differently to a user depending on recommendation time points, according to an embodiment.

Referring to FIG. 12A, the operations 1200 may be performed by a processor of the manual support server 230 or a processor of the service server 260.

At operation 1210, the processor selects a function (e.g., "my favorite" function) to be recommended among functions of the user device. For example, based on the group profile of a group to which the user device belongs, the processor may select a specific function corresponding to a usage type with a certain preference or higher as a function to be recommended to the user.

At operation 1220, the processor determines a recommendation time point for the selected function based on the usage history of the user device. For example, the processor may recognize the absence of the usage history in the DB as the user device is newly registered as a member of the group 210, and thus determine the recommendation time point of the selected function as "initial", which means when the user uses the user device for the first time. The processor may retrieve the usage history of the user device from the DB and then check, from the usage history, the period of time the user has used the device for. If the usage period exceeds a given threshold, the processor may determine the recommendation time point of the selected function as "after use", which means after the user device is used.

At operation 1230, the processor generates recommendation information, based on the determined recommendation time point. For example, referring to FIG. 12B, when the recommendation time point is "initial", the processor may generate first recommendation information 1240 for allowing the user to know what the selected function (e.g., "my favorite" function) is. When the recommendation time point is "after use", the processor may generate second recommendation information 1250 for allowing the user to know of a detail usage method for the selected function (e.g., how to register a function as having a higher preference than "my favorite" function).

Figure 13:
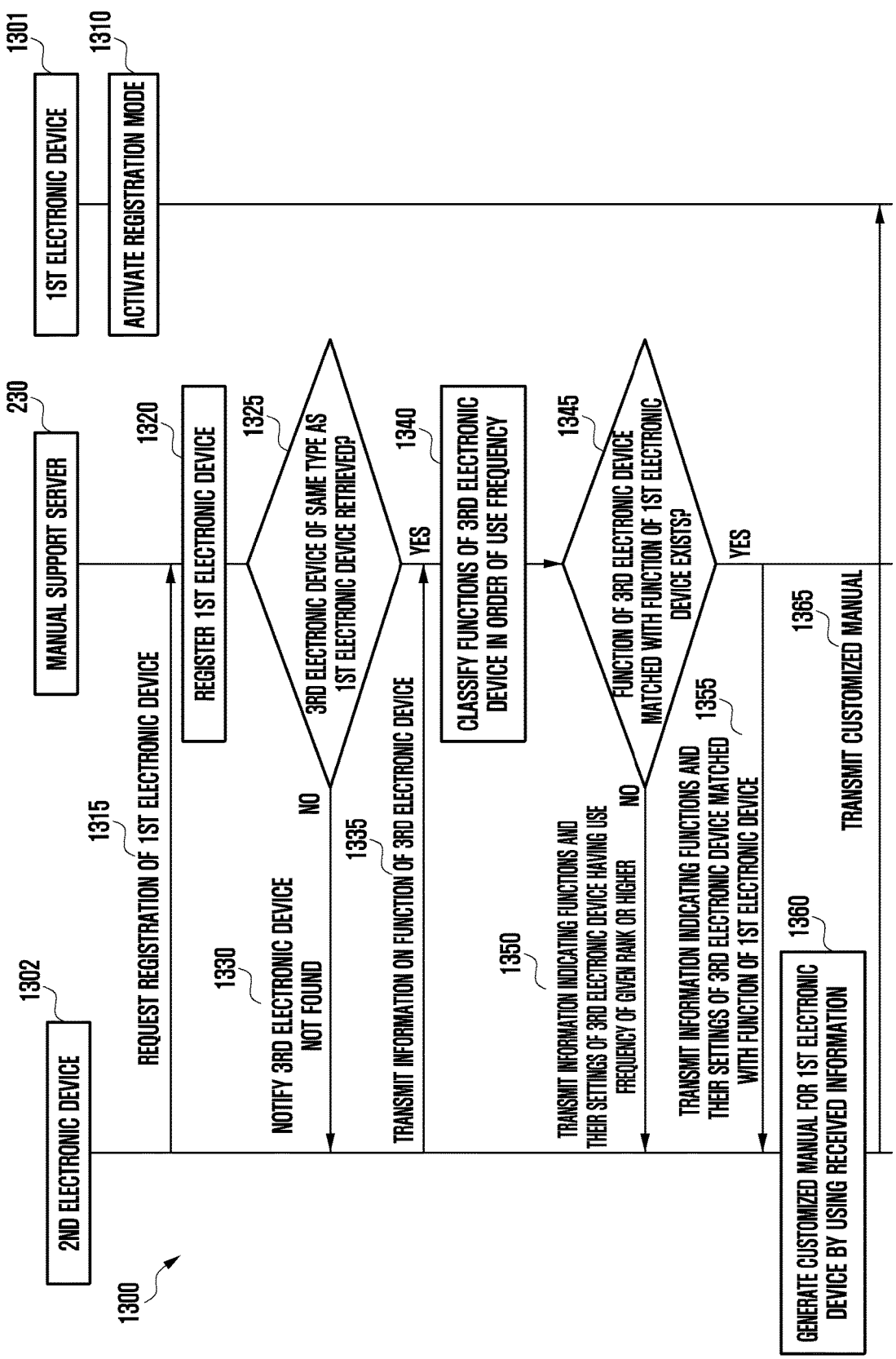
FIG. 13 is a flow diagram illustrating operations performed in the network environment of FIG. 2, according to an embodiment.

FIG. 13 is a flow diagram illustrating operations 1300 performed in the network environment 200 of FIG. 2, according to an embodiment.

Referring to FIG. 13, a first electronic device 1301 may be a device that a user wants to register as a new member of the group 210, and a second electronic device 1302 may be a user device (e.g., a remote control device) that has been already registered in the group 210.

At operation 1310, the first electronic device 1301 activates a registration mode for registering the first electronic device 1301 in the group 210. For example, a processor of the first electronic device 1301 may transmit (e.g., broadcast) identification information of the first electronic device 1301 through a short-range wireless communication circuit (e.g., a WiFi communication circuit), so that the second electronic device 1302 recognizes the existence of the first electronic device 1301.

At operation 1315, the second electronic device 1302 transmits, to the manual support server 230, a registration request message that contains device information (e.g., information indicating an electronic device type, information about functions and settings, or a manual) of the first electronic device 1301 obtained using a short-range wireless communication circuit.

At operation 1320, the manual support server 230 performs, in response to the registration request, a registration procedure including an operation of storing the device information of the first electronic device 1301 in the device information DB of the group 210, thereby completing the registration of the first electronic device 1301. The manual support server 230 may receive the device information of the first electronic device 1301 from the first electronic device 1301. For example, the manual support server 230 may transmit, to the first electronic device 1301, a device information request message containing the identification information of the first electronic device 1301 received from the second electronic device 1302. In response to receiving the device information request message, the first electronic device 1301 may transmit the device information to the manual support server 230.

At operation 1325, the manual support server 230 retrieves a third electronic device of the same type as the first electronic device 1301 from the device information DB or the user device profile DB of the group 210.

If the third electronic device of the same type as the first electronic device 1301 is not found in the DB (i.e., NO branch of operation 1325), the manual support server 230 may transmit, at operation 1330, a related notification message to the second electronic device 1302. Upon receiving this message, the second electronic device 1302 may provide an interface screen for allowing the user to input identification information (e.g., a brand name or a model name) of the third electronic device and selecting a function of the third electronic device through a display, and then transmit information on the function(s) of the third electronic device selected through the interface screen to the manual support server 230 at operation 1335. If the third electronic device of the same type as the first electronic device 1301 is found in the DB (i.e., YES branch of operation 1325), the manual support server 230 performs operation 1340.

At operation 1340, the manual support server 230 classifies the functions of the third electronic device retrieved at the operation 1325 or recognized through the interface screen of the second electronic device 1302 in the order of use frequency (e.g., as shown in Table 5, above).

At operation 1345, the manual support server 230 determines whether, among functions of the third electronic device having a predetermined rank (e.g., a third rank) or higher, there is a function matched with a function of the first electronic device 1301.

If it is determined that there is no function matched with a function of the first electronic device 1301 (i.e., No branch of operation 1345), the manual support server 230 transmits, at operation 1350, information indicating the functions, together with their settings, of the third electronic device having a predetermined rank (e.g., a third rank) or higher to the second electronic device 1302.

If it is determined that there is a function matched with a function of the first electronic device 1301 (i.e., YES branch of operation 1345), the manual support server 230 transmits, at operation 1355, information indicating the function, together with its settings, of the third electronic device matched with a function of the first electronic device 1301 to the second electronic device 1302.

At operation 1360, the second electronic device 1302 generates a customized manual for the first electronic device 1301 by using the information received from the manual support server 230.

At operation 1365, the second electronic device 1302 transmits the customized manual to the first electronic device 1301 such that the customized manual is applied as a manual for manipulating the first electronic device 1301.

Figure 14:
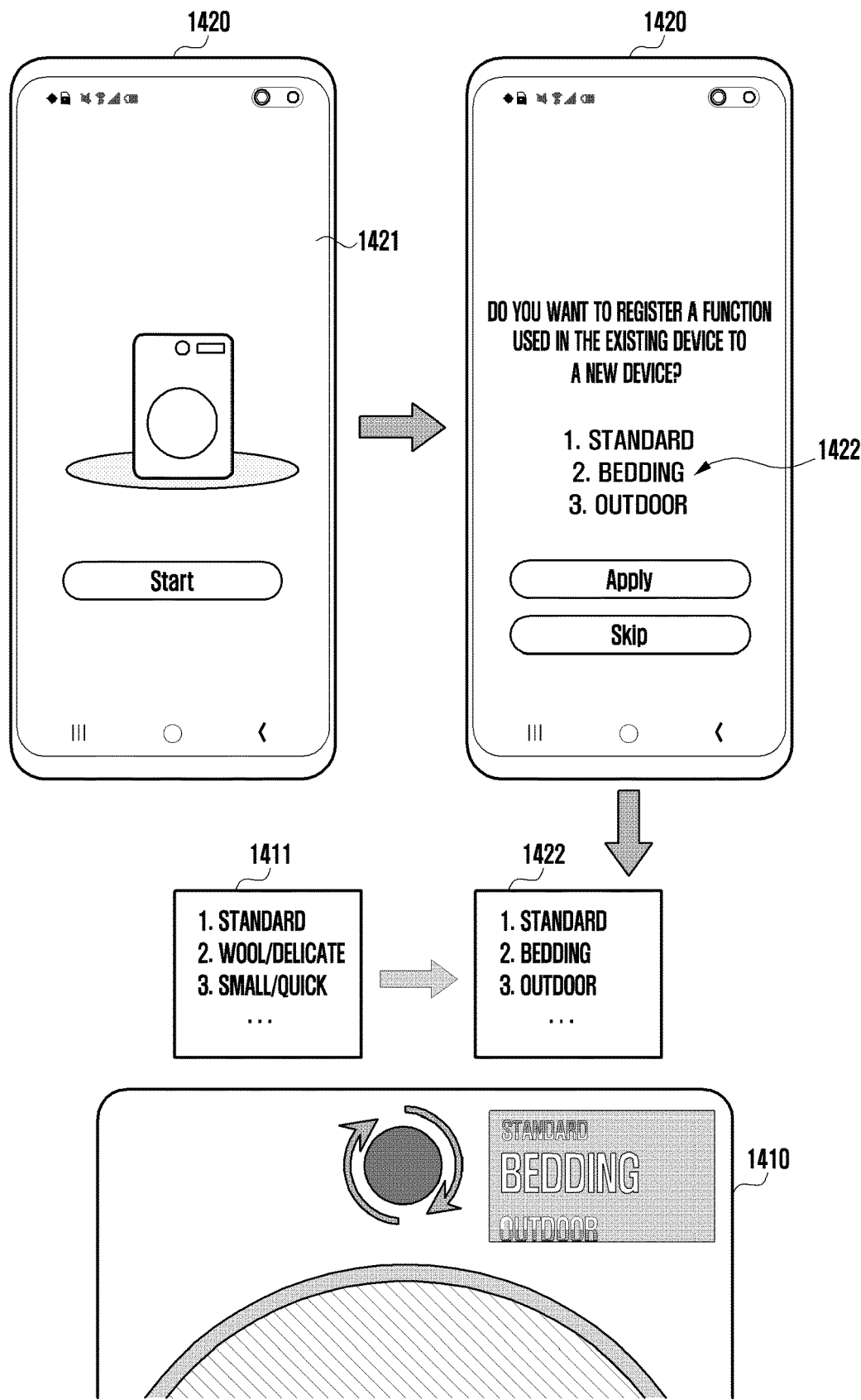
FIG. 14 is a diagram illustrating an operation of generating a customized manual for a new same-type user device based on a usage history of an existing user device registered in the group, according to an embodiment.

FIG. 14 is a diagram illustrating an operation of generating a customized manual for a new same-type user device based on a usage history of an existing user device registered in the group 210, according to an embodiment.

Referring to FIG. 14, a first user device 1410 may be a new user device (e.g., the first electronic device 1301 in FIG. 13) newly registered in the group 210, and a second user device 1420 may be a device (e.g., the second electronic device 1302 in FIG. 13) supporting registration of the first user device 1410 among the existing user devices belonging to the group 210. For example, a procedure for registering the first user device 1410 as a member of the group 210 may be started through a registration screen 1421 provided by the second user device 1420.

When the registration procedure of the first user device 1410 is completed, a processor of the second user device 1420 may retrieve a third user device of the same type (e.g., a washing machine) as the first user device 1410 from the device information DB or the group profile DB of the group 210 provided by the manual support server 230. If the same-type of device as the third user device is not found in the DB, the processor of the second user device 1420 may obtain identification information (e.g., a brand name or a model name) of the third user device directly from the user through an interface screen.

The processor of the second user device 1420 may identify a usage history of the third user device from the manual support server 230 and classify functions of the third user device in the order of use frequency by using the usage history (e.g., as shown in Table 5, above). The processor of the second user device 1420 may select functions (e.g., standard wash, bedding wash, and random wash in Table 5) having a given rank or higher from among functions of the third user device.

The processor of the second user device 1420 may select a function (e.g., standard wash in Table 6) of the first user device 1410 to which the same setting values (e.g., a water temperature, the number of rinses, or a spin-dry strength for the standard wash) as those of the selected function of the third user device are applied.

The processor of the second user device 1420 may display, through a display (e.g., a touch-sensitive display), a customized manual 1422 containing items indicating the selected functions of the first user device 1410, and buttons (e.g., "Apply" and "Skip") for allowing the user to select whether to use the customized manual on the first user device 1410.

If the user selects using the customized manual 1422 on the first user device 1410, the processor of the second user device 1420 may transmit the customized manual 1422 to the first user device 1410 to use the customized manual 1422, instead of default manual 1411, as a manual for manipulating the first user device 1410.

Meanwhile, the function of the first user device 1410 to which the same setting values as those of the selected function of the third user device (e.g., as shown in Table 12, below) are applied may not be set in the first user device 1410 (e.g., NO branch of operation 1345 in FIG. 13). In this case, the processor of the second user device 1420 may add an item corresponding to the selected function of the third user device to the default manual of the first user device 1410 to generate a customized manual (e.g., as shown in Table 13, below).

TABLE 12

| Frequency rank | Function | Water temp. | Number of rinses | Spin-dry strength |
|---|---|---|---|---|
| 1 | Standard wash (User-defined) | 40 | 4 | Medium |
| 2 | Bedding wash (User-defined) | 60 | 3 | Strong |

TABLE 13

| Function | Water temp. | Number of rinses | Spin-dry strength |
|---|---|---|---|
| Standard wash | 40 | 3 | Strong |
| Standard wash (User-defined) | 40 | 4 | Medium |
| Bedding wash (User-defined) | 60 | 3 | Strong |
| Bedding wash | 60 | 2 | Strong |
| Delicate wash | 30 | 2 | Weak |
| . . . | . . . | . . . | . . . |

Figure 15:
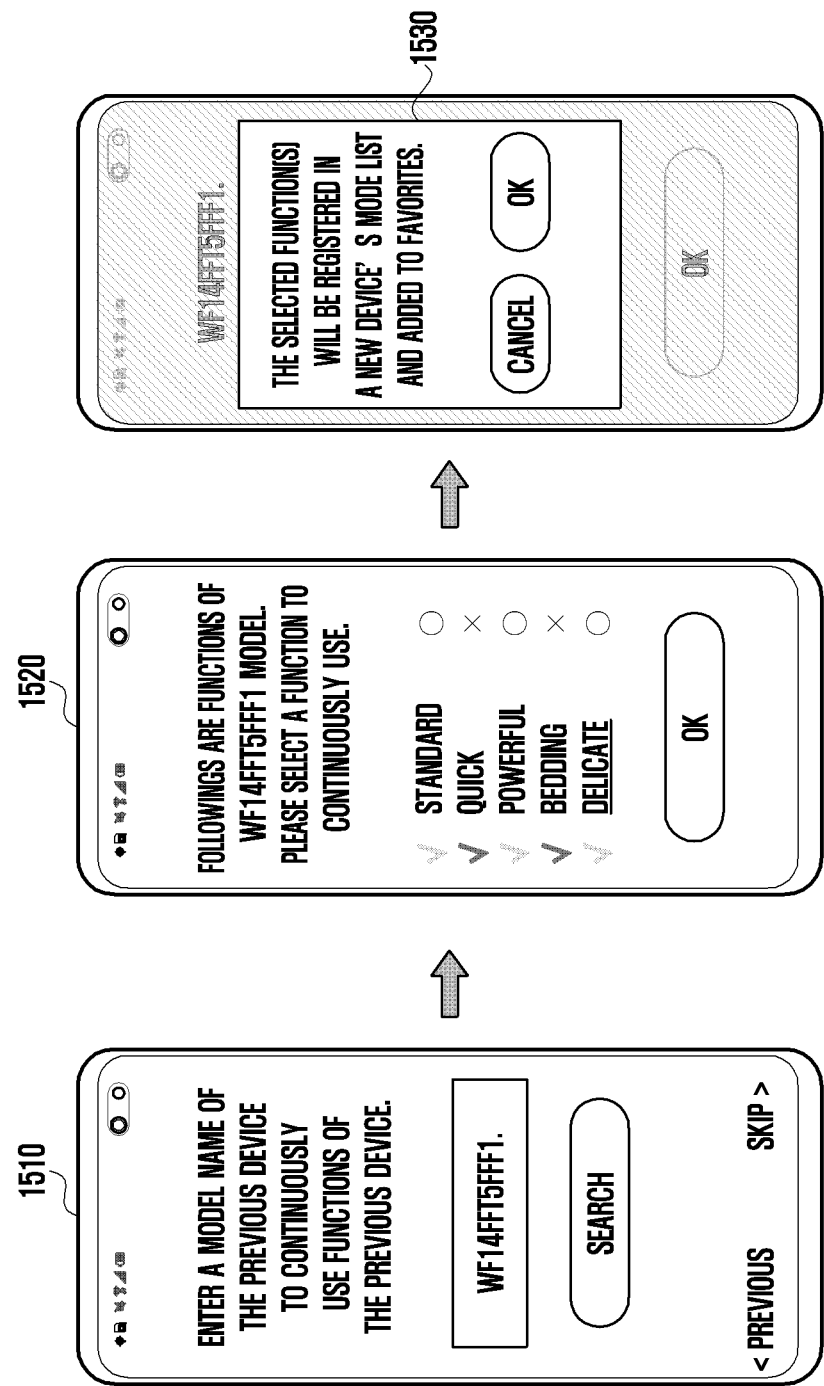
FIG. 15 is a diagram illustrating an operation of generating a customized manual for a new user device by using information on functions set in an existing user device registered in the group, according to an embodiment.

FIG. 15 is a diagram illustrating an operation of generating a customized manual for a new user device by using information on functions set in an existing user device registered in the group 210, according to an embodiment.

Referring to FIG. 15, the existing user device (e.g., the second electronic device 1302 in FIG. 13, hereinafter, a second user device) may display, on a display thereof, interface screens 1510, 1520, and 1530 for interacting with a user to generate a customized manual for the new user device (e.g., the first electronic device 1301 in FIG. 13).

As described above, a third user device of the same type as the first user device may not be retrieved from the manual support server 230. In this case, the processor of the second user device may display, on the display (e.g., a touch-sensitive display), a first interface screen 1510 for allowing the user to input identification information of the third user device (e.g., a model name of the third user device that the user has used in the past). The processor of the second user device may transmit the identification information (e.g., the model name "WF14FFT5FFF1"), inputted through the first interface screen 1510, to the manual support server 230 and thereby retrieve the third user device from the manual support server 230. The manual support server 230 may obtain a usage history of the third user device corresponding to the received identification information and reply to the second user device. For example, as shown in Table 14, below, the usage history may contain functions, setting values applied to each function, and information indicating whether the same function is applied to the first user device.

TABLE 14

| Function | Water temp. | Number of rinses | Spin-dry strength | Same function |
|---|---|---|---|---|
| Standard wash | 40 | 3 | Strong | ○ |
| Quick wash | 40 | 4 | Medium | X |
| Powerful wash | 60 | 3 | Strong | X |
| Bedding wash | 60 | 2 | Strong | ○ |
| Delicate wash | 30 | 2 | Weak | ○ |
| ... | ... | ... | ... | ... |

The processor of the second user device may display, on the display, an interface screen that contains information related to the usage history of the third user device received from the manual support server 230. For example, the processor may display a second interface screen 1520 that contains the functions of the third user device and information indicating whether each function is applied to the first user device.

When the user selects at least one (e.g., quick wash or bedding) of the functions of the third user device in the second interface screen 1520, the processor of the second user device may display, on the display, a third interface screen 1530 that requests confirmation of the user as to whether to apply the selected function(s) to the first user device. Upon receiving user's confirmation through the third interface screen 1530, the processor may generate a customized manual for the first user device by adding an item corresponding to the selected function to the manual of the first user device.

Figure 16:
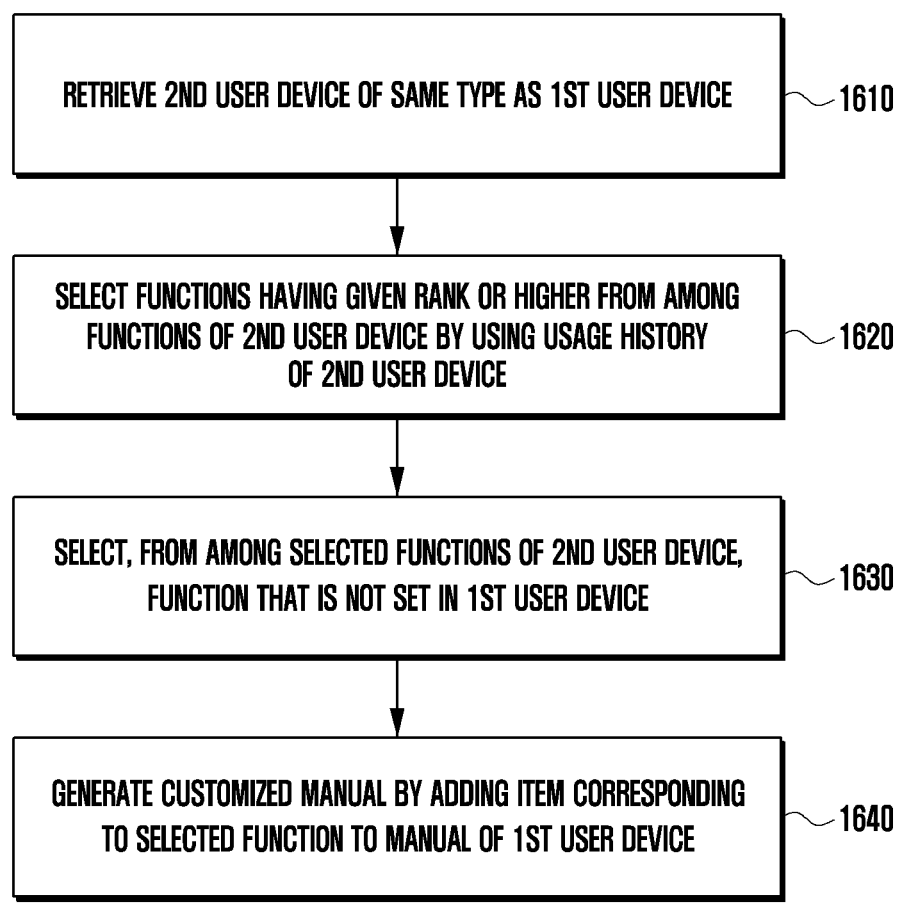
FIG. 16 is a flow diagram illustrating operations of generating a customized manual for a new same-type user device newly registered in a group of an existing user device, based on a usage history of the existing user device, according to an embodiment.

FIG. 16 is a flow diagram illustrating operations 1600 for generating a customized manual for a new same-type user device newly registered in a group of an existing user device based on a usage history of the existing user device, according to an embodiment. The operations 1600 may be performed by a processor of the manual support server 230 or a processor of the service server 260.

At operation 1610, the processor retrieves, from the device information DB or the user device profile DB of a user device group to which the new user device (hereinafter, a first user device) belongs, the existing user device (hereinafter, a second user device) of the same type as the first user device.

The processor may identify a usage history of the second user device in the usage history DB of the corresponding group, and classify the functions of the second user device in the order of use frequency by using the identified usage history. At operation 1620, the processor selects particular functions having a given rank or higher from among the functions of the second user device. For example, referring to Table 15, below, if the second user device belongs to the first user device group, the functions "standard wash", "standard wash (user-defined)", and "bedding wash (user-defined)" may be selected. If the second user device belongs to the second user device group, the functions "standard wash (user-defined)", "standard wash", and "delicate wash" may be selected.

TABLE 15

| Group | Frequency rank | Function | Water temp. | Number of rinses | Spin-dry strength |
|---|---|---|---|---|---|
| 1st user device group | 1 | Standard wash | 40 | 2 | Medium |
| | 2 | Standard wash (User-defined) | 40 | 4 | Medium |
| | 3 | Bedding wash (User-defined) | 60 | 3 | Strong |
| ... | ... | ... | ... | ... | ... |
| 2nd user device group | 1 | Standard wash (User-defined) | 40 | 3 | Medium |
| | 2 | Standard wash | 40 | 2 | Medium |
| | 3 | Delicate wash | 30 | 2 | Weak |
| ... | ... | ... | ... | ... | ... |

At operation 1630, the processor selects, from among the selected functions of the second user device, a function that is not set in the first user device. For example, if the second user device belongs to the first user device group, the functions "standard wash (user-defined)" and "bedding wash (user-defined)" may be selected. If the second user device belongs to the second user device group, the function "standard wash (user-defined)" may be selected.

At operation 1640, the processor generates a customized manual by adding an item corresponding to the selected function to the manual of the first user device.

Figure 17:
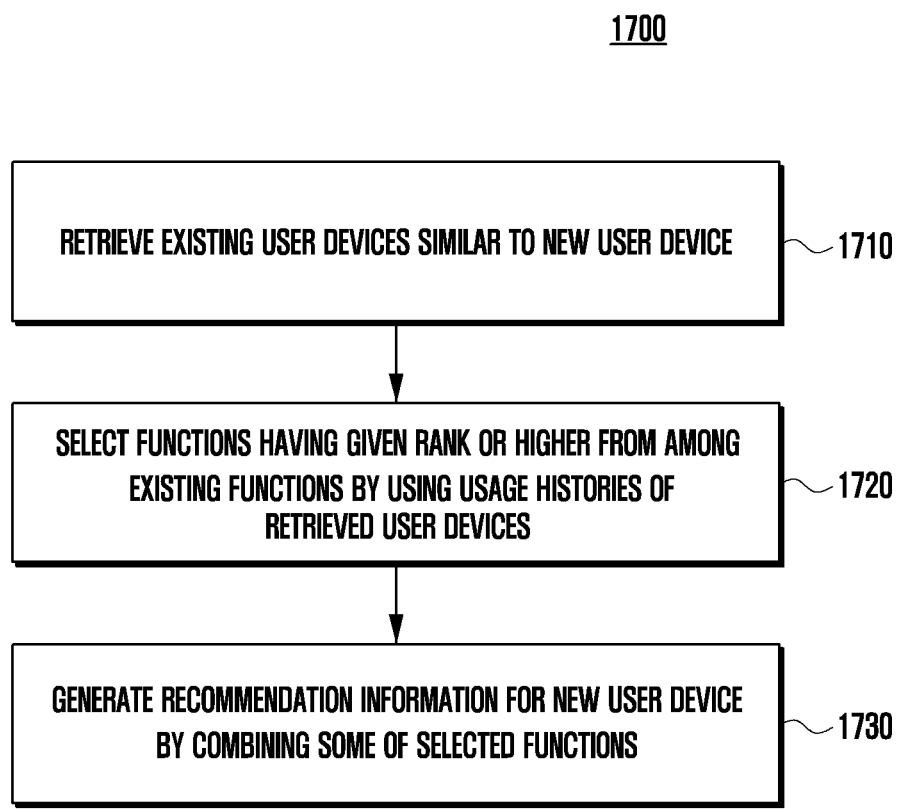
FIG. 17 is a flow diagram illustrating operations of generating recommendation information for a new user device newly registered in a group, based on usage histories of existing user devices registered in the group, according to an embodiment.

FIG. 17 is a flow diagram illustrating operations 1700 for generating recommendation information for a new user device newly registered in a group 210 based on usage histories of existing user devices registered in the group 210, according to an embodiment. The operations 1700 may be performed by a processor of the manual support server 230 or a processor of the service server 260.

At operation 1710, the processor retrieves a plurality of existing user devices similar to the new user device (hereinafter, a first user device) in the device information DB or group profile DB of the group 210 provided by the manual support server 230. For example, the processor may recognize the type of the first user device (e.g., an air conditioner), based on the corresponding device information, and retrieve a second user device classified as the recognized type from the device information DB of the group 210. The processor may recognize a function (e.g., an air cleaning function) performed by the first user device, based on the corresponding device information, and retrieve a third user device (e.g., an air cleaner) capable of performing the same function as the recognized function.

The processor may identify usage histories of the retrieved user devices in the usage history DB of the group 210, and classify the functions of the retrieved user devices in the order of use frequency by using the identified usage histories. In operation 1720, the processor selects particular functions having a given rank or higher from among the classified functions. For example, referring to Table 16, below, the processor may select, from among the functions of the air cleaner, particular functions "auto", "no wind", "turbo", and "sleep", which have higher use frequencies, as a source for generating a customized manual of the first user device. Also, the processor may select, from among the functions of the air conditioner, particular functions "no wind", "weak", "turbo", and "sleep mode", which have higher use frequencies, as a source for generating a customized manual for the first user device.

TABLE 16

| Device type | Frequency rank | Function | Main use time | Average duration |
|---|---|---|---|---|
| Air cleaner | 1 | Auto | 18:00~23:00 | 2 hrs |
| | 2 | No wind | 13:00~23:00 | 1 hrs |
| | 3 | Turbo | 12:00~14:00 | 30 mins |
| | 4 | Sleep | 24:00~3:00 | 3 hrs |
| ... | ... | ... | ... | ... |
| Air conditioner | 1 | No wind | 15:00~18:00 | 2 hrs |
| | 2 | Weak | 13:00~23:00 | 1 hrs |
| | 3 | Turbo | 12:00~14:00 | 30 mins |
| | 4 | Sleep mode | 24:00~3:00 | 3 hrs |
| ... | ... | ... | ... | ... |

At operation 1730, the processor generates recommendation information for the first user device by combining some of the selected functions. For example, the processor may compare the selected functions of the air conditioner with the selected functions of the air cleaner, recognize a particular function of the air conditioner and a particular function of the air cleaner having the same setting values, and generate recommendation information containing an item corresponding to a combination of the recognized functions. The processor may recognize that the same setting values are applied to the function "no-wind cooling" of the air conditioner and the function "no-wind air cleaning" of the air cleaner, and add a new item indicating a combination of these functions (e.g., a function named "no-wind cooling & air-cleaning") to the recommendation information. Additionally, the processor may recognize that the same setting values are applied to the function "sleep mode cooling" of the air conditioner and the function "sleep air cleaning" of the air cleaner, and add a new item indicating a combination of these functions (e.g., a function named "sleep mode cooling & air-cleaning") to the recommendation information.

Figure 18A:
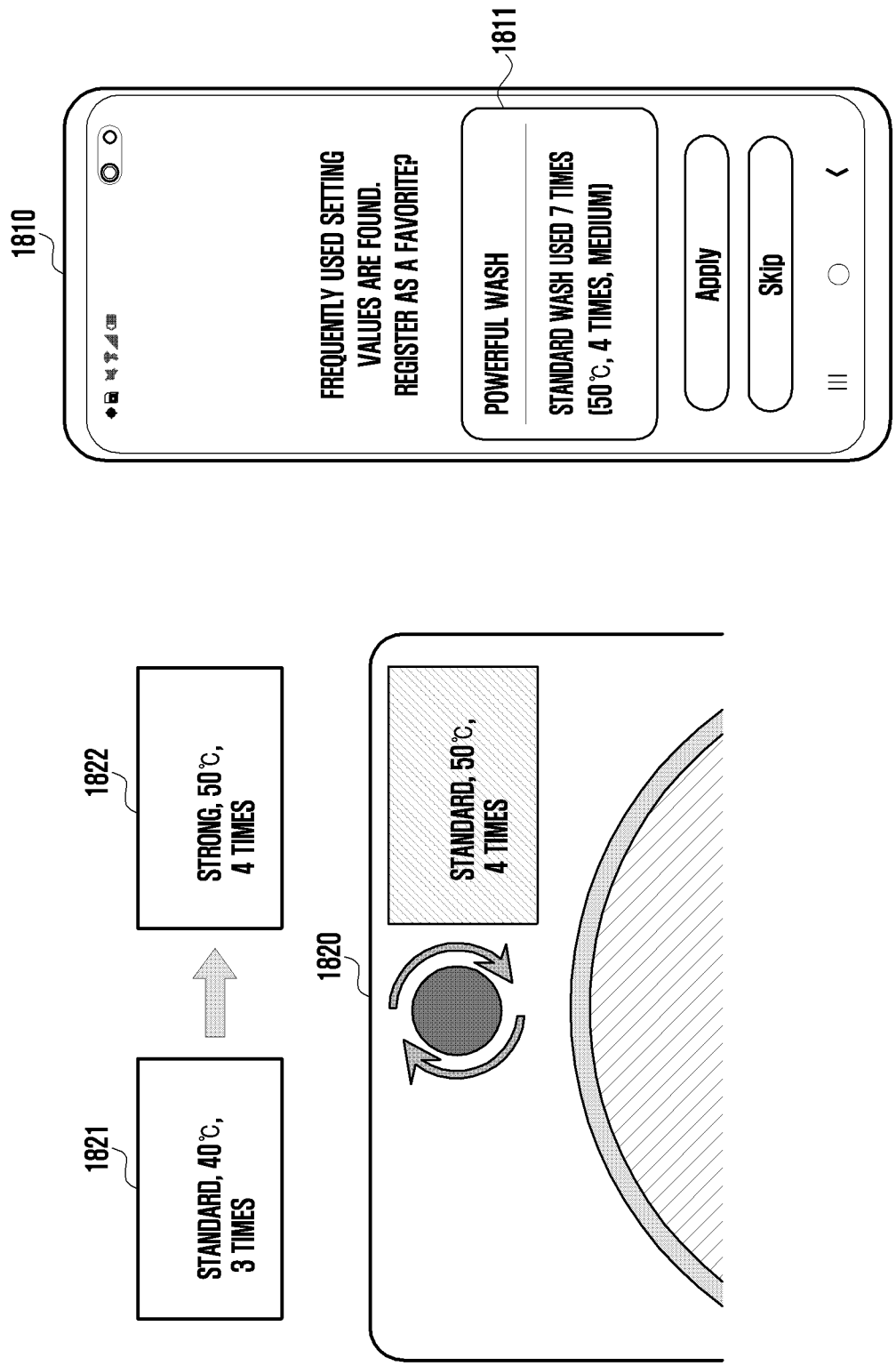
FIG. 18A is a diagram illustrating an operation of recommending a function of a user device based on a usage history of the user device, according to an embodiment.
Figure 18B:
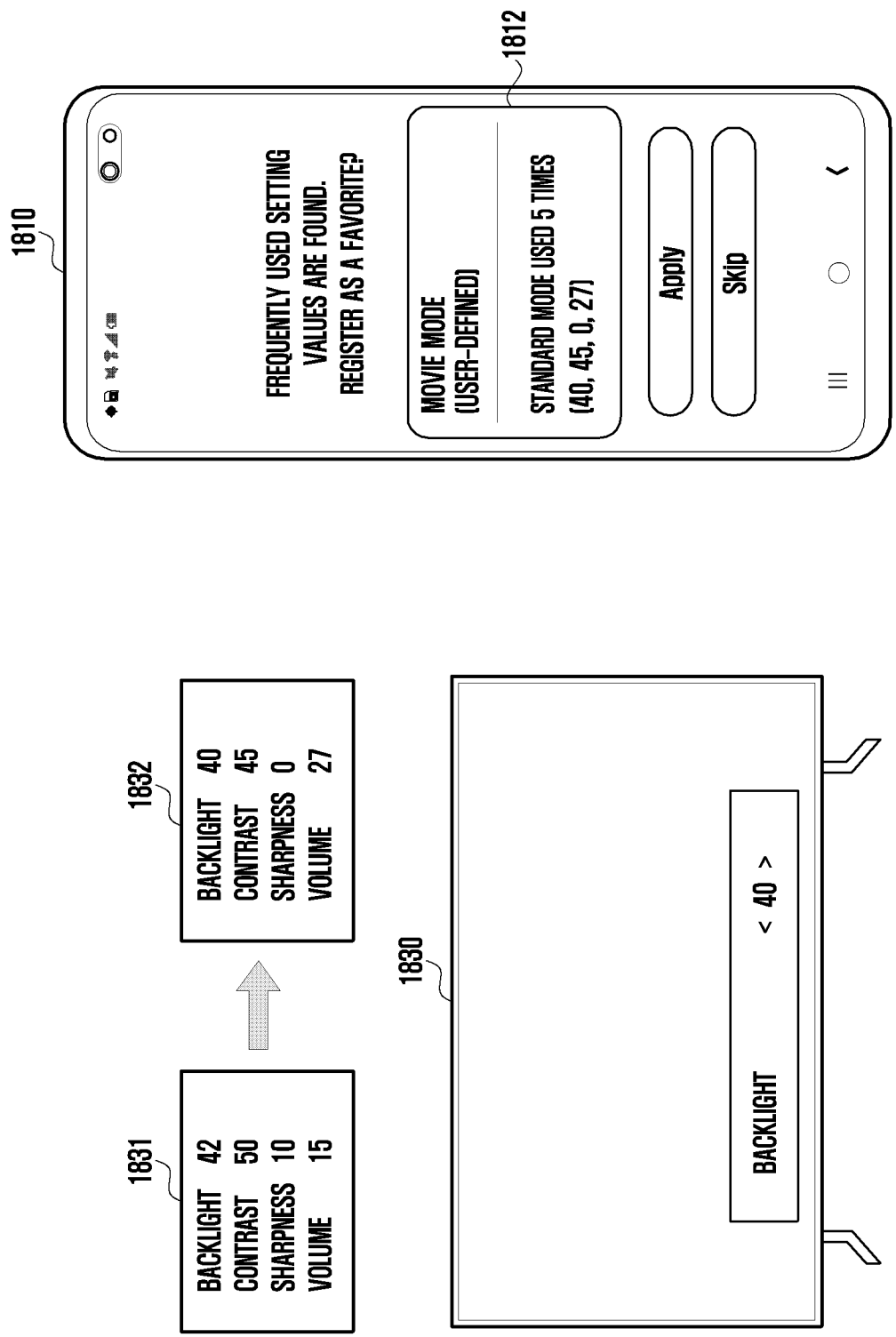
FIG. 18B is a diagram illustrating an operation of recommending a function of a user device based on a usage history of the user device, according to an embodiment.

FIGS. 18A and 18B are diagrams illustrating an operation of recommending a function of a user device based on a usage history of the user device, according to an embodiment.

Referring to FIG. 18A, a processor of a first user device 1810 (e.g., a remote control device) may retrieve a usage history of a second user device 1820 (e.g., a washing machine) from a usage history DB (e.g., the usage history DB provided by the manual support server 230). Based on the retrieved usage history, the processor may generate recommendation information and display the recommendation information through a display. The processor may recognize, from the usage history of the second user device 1820, that setting values applied to a first function of the second user device 1820 have been changed (e.g., the water temperature is changed from 40 to 50 degrees and the spin-dry strength is changed from standard to strong) and then the first function has been performed a given number of times or more based on the changed setting values. In a more detailed example, the processor may recognize, from the usage history of the second user device 1820, that first setting values 1821 (e.g., 40 degrees, 3 times, and standard) applied to settings (e.g., a water temperature, the number of rinses, and a spin-dry strength) of the first function (e.g., a standard wash) have been changed to second setting values 1822 (e.g., 50 degrees, 4 times, strong), and then the standard wash has been performed a given number of times (e.g., 7 times) or more based on the second setting values 1822. Based on this recognition, the processor may generate recommendation information for recommending the first function having the changed setting values (i.e., the second setting values 1822) as a new function (e.g., "my favorite" function) to the user such that the second user device 1820 will perform the first function with user's desired setting values without any change of setting values by the user. Additionally, the processor may recognize, from the usage history of the second user device 1820, that the second user device 1820 already has a second function (e.g., a powerful wash function) to which the same setting values as the changed setting values (i.e., the second setting values 1822) are applied. In this case, the processor may generate and display first recommendation information 1811 for notifying that the second function is a function with user's desired setting values applied and also for recommending adding the second function as "my favorite" function to the manual of the second user device 1820.

Referring to FIG. 18B, the processor of the first user device 1810 may retrieve a usage history of a third user device 1830 (e.g., a TV) from the usage history DB. Based on the retrieved usage history, the processor may generate recommendation information and display the recommendation information through the display. The processor may recognize, from the usage history of the third user device 1830, that first setting values 1831 (e.g., 42, 50, 10, and 15) applied to settings (e.g., backlight, contrast, sharpness, and volume) of a standard viewing mode have been changed to second setting values 1832 (e.g., 40, 45, 0, and 27), and then the standard viewing mode has been performed a given number of times (e.g., 5 times) or more based on the second setting values 1832. Based on this recognition, the processor may generate and display second recommendation information 1812 for recommending the standard viewing mode (a user-defined mode) having the changed setting values (i.e., the second setting values 1832) as a new viewing mode (e.g., a movie mode) to the user.

According to an embodiment, an electronic device may include a communication circuit; a memory; and a processor connected to the communication circuit and the memory, wherein the memory stores instructions causing, upon being executed, the processor to store a usage history in the memory, the usage history collected from a plurality of user devices registered in a user device group through the communication circuit, to receive device information indicating functions of a first user device (e.g., a new home appliance) in the user device group from the first user device or a second user device (e.g., a smart phone) in the user device group through the communication circuit, to select a function to be recommended to a user from among the functions of the first user device, based on at least the usage history, to generate a customized manual to allow the user to use the recommended function of the first user device, and to transmit, to the first user device or the second user device through the communication circuit, the customized manual or recommendation information for recommending the customized manual to the user.

The instructions may further cause the processor to generate, based on the usage history, a group profile that includes information indicating usage types of the user for the user device group and information indicating the user's preference for each usage type, to select, upon determining (e.g., NO branch of the operation 610 in FIG. 6) that there is no user device of a same type as the first user device in the user device group, and based on the group profile, at least one of the functions of the first user device as the recommended function, and to select, upon determining (e.g., YES branch of the operation 610 in FIG. 6) that there is a third user device of a same type as the first user device in the user device group, and based on a usage history of the third user device, a function of the first user device matched with a function of the third user device as the recommended function.

The instructions may further cause the processor to, as a part of an operation of selecting the recommended function, based on the group profile, select (e.g., the operation 1120), from among the usage types, at least one usage type having a higher preference than other usage types, and select, from among the functions of the first user device, a function related to the selected usage type as the recommended function.

The instructions may further cause the processor to, as a part of an operation of selecting the recommended function, based on the usage history of the third user device, select, from among the functions of the third user device, a function having a predetermined use frequency or more, and select a function of the first user device matched with the selected function of the third user device as the recommended function. The instructions may cause the processor to select a function of the first user device having the same setting values as setting values (e.g., in a standard wash, a water temperature is 40 degrees, the number of rinses is 3 times, and a spin-dry strength is medium) applied to the selected function of the third user device as the recommended function.

The instructions may further cause the processor to receive the usage history from the first user device through the communication circuit, to recognize a setting having a usage frequency greater than or equal to a predetermined threshold from settings of the received usage history, and to update (e.g., the operation 730) the group profile by adjusting upwards a preference of a usage type related to the recognized setting. The group profile may further include information indicating a user's proficiency for each usage type, and the instructions may cause the processor to update the group profile by adjusting upwards a proficiency of a usage type related to the recognized setting. The instructions may cause the processor to select, as the recommended function, a function of the first user device related to the usage type whose proficiency is adjusted upwards. The instructions may cause the processor to recognize, based on the usage history received from the first user device, a sub-function that has never been used among sub-functions of the function of the first user device related to the usage type whose proficiency is adjusted upwards, and to select the recognized sub-function as the recommended function.

The instructions may further cause the processor to generate, based on the usage history, a group profile that includes information indicating the user's usage types for the user device group and information indicating the user's preference for each usage type, to determine a recommendation time point, based on at least the usage type corresponding to the recommended function, and to transmit (e.g., the operation 820) information indicating the recommendation time point to the first user device or the second user device such that the recommendation information is displayed at the recommendation time point. The recommendation time point may be a time point when the first user device registered in the user device group is used for a first time, a time point before the first user device is used, a time point when the first user device is in use, or a time point after the first user device is used. The instructions may cause the processor to provide (e.g., the operation 1230) the recommendation information differently depending on the recommendation time point.

The instructions may further cause the processor to generate, based on the usage history, a group profile that includes information indicating the user's usage types for the user device group and information indicating the user's preference for each usage type, and to generate the customized manual by using the group profile and a manual for the functions of the first user device. The instructions may cause the processor to, as a part of an operation of generating the customized manual by using the group profile and a default manual containing items corresponding to the functions of the first user device, generate the customized manual by adjusting (e.g., the operation 920) an order of function items of the default manual so that a function item corresponding to a usage type having a higher preference is preferentially selected instead of a function item corresponding to a usage type having a lower preference. The group profile may further include information indicating the user's proficiency for each usage type, and the instructions may cause the processor to generate the customized manual by adjusting an order of function items of the default manual so that a function item having a low proficiency is preferentially selected instead of a function item having a high proficiency.

The instructions may further cause the processor to, as a part of an operation of generating the customized manual, classify, upon determining that there is a third user device of the same type as the first user device in the user device group, and using a usage history of the third user device, functions of the third user device in an order of use frequency, to select (e.g., the operation 1620) functions having a given rank or higher from among the functions of the third user device, to select (e.g., the operation 1630), from among the selected functions of the third user device, a function that is not set in the first user device, and to generate (e.g., the operation 1640) the customized manual by adding an item corresponding to the selected function that is not set in the first user device to a manual of the first user device.

The instructions may further cause the processor to, when user devices similar to the first user device are retrieved from a device information DB of the user device group, classify functions of the retrieved user devices in an order of use frequency by using usage histories of the retrieved user devices, to select (e.g., the operation 1720) functions having a given rank or higher from among the classified functions, and to generate (e.g., the operation 1730) the recommendation information by combining some of the selected functions. The user devices similar to the first user device may include a user device having a same type as a type of the first user device, and a user device configured to perform a same function as a function of the first user device.

According to an embodiment, a mobile electronic device (e.g., a smart phone in the user device group 210 in FIG. 2) may include a communication circuit; a display; a memory;

and a processor connected to the communication circuit, the display, and the memory, wherein the memory stores instructions causing, upon being executed, the processor to store a usage history in the memory, the usage history collected from a plurality of user devices registered in a user device group through the communication circuit, to receive device information indicating functions of an external electronic device (e.g., a new home appliance) from the external electronic device through the communication circuit, to select a function to be recommended to a user from among the functions of the external electronic device, based on at least the usage history, to generate a customized manual to allow the user to use the recommended function, and to display, through the display, recommendation information for recommending the customized manual to the user.

According to an embodiment, a mobile electronic device (e.g., a smart phone in the user device group 210 in FIG. 2) may include a communication circuit; a touch-sensitive display; a memory; and a processor connected to the communication circuit, the display, and the memory, wherein the memory stores instructions causing, upon being executed, the processor to transmit device information indicating a type of a first user device (e.g., a new home appliance) and functions of the first user device to a server (e.g., the manual support server 230 in FIG. 2) through the communication circuit, to receive, from the server through the communication circuit, a customized manual for allowing a user to use a function selected by the server from among the functions of the first user device, to display, through the display, a first message for confirming whether to use the customized manual on the first user device, to receive a user input through the display in response to the first message, and to transmit the customized manual to the first user device when the user input indicates that the customized manual is to be used on the first user device.

The instructions may further cause the processor to receive, from the server, a second message indicating that a user device of a same type as the first user device is not registered in the server, to display (e.g., displaying the first interface screen 1510 in FIG. 15), upon receiving the second message, a third message requesting identification information of a second user device of a same type as the first user device on the display, to transmit, to the server through the communication circuit, the identification information received in response to the third message through the display, to display, on the display (e.g., displaying the second interface screen 1520 in FIG. 15), information on functions of the second user device received from the server, and to transmit, to the server through the communication circuit, information indicating a function selected by a user from among the functions of the second user device.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a communication circuit;
a memory; and
a processor connected to the communication circuit and the memory,
wherein the memory stores instructions causing, upon being executed, the processor to:

store a usage history in the memory, the usage history collected from a plurality of user devices in a user device group through the communication circuit, generate, based on the usage history, a group profile that includes information indicating usage types of the user for the user device group and information indicating the user's preference for each usage type, receive device information indicating functions of a first user device in the user device group from at least one of the first user device or a second user device in the user device group through the communication circuit, select, upon determining that there is no user device of a same type as the first user device in the user device group, and based on the group profile, at least one of the functions of the first user device as a recommended function to a user, select, upon determining that there is a third user device of a same type as the first user device in the user device group, and based on a usage history of the third user device, a function of the first user device matched with a function of the third user device as the recommended function, generate a customized manual to allow the user to use the recommended function of the first user device, and transmit, to the first user device or the second user device through the communication circuit, at least one of the customized manual or recommendation information for recommending the customized manual to the user.

2. The electronic device of claim 1, wherein the instructions further cause the processor to:
as a part of an operation of selecting the recommended function, based on the group profile, select, from among the usage types, at least one usage type having a higher preference than other usage types, and select, from among the functions of the first user device, a function related to the selected usage type as the recommended function.

3. The electronic device of claim 1, wherein the instructions further cause the processor to:
as a part of an operation of selecting the recommended function, based on the usage history of the third user device, select, from among the functions of the third user device, a function having a predetermined use frequency or more, and select a function of the first user device matched with the selected fiction of the third user device as the recommended function.

4. The electronic device of claim 3, wherein the instructions further cause the processor to:
select a function of the first user device having the same setting values as setting values applied to the selected function of the third user device as the recommended function.

5. The electronic device of claim 1, wherein the instructions further cause the processor to:
receive the usage history from the first user device through the communication circuit, recognize a setting having a usage frequency greater than or equal to a predetermined threshold from settings of the received usage history, and update the group profile by adjusting upwards a preference of a usage type related to the recognized setting.

6. The electronic device of claim 5, wherein the group profile further includes information indicating a user's proficiency for each usage type, and
wherein the instructions further cause the processor to:
update the group profile by adjusting upwards a proficiency of a usage type related to the recognized setting.

7. The electronic device of claim 6, wherein the instructions further cause the processor to:
  select, as the recommended function, a function of the first user device related to the usage type whose proficiency is adjusted upwards.

8. The electronic device of claim 7, wherein the instructions further cause the processor to:
  recognize, based on the usage history received from the first user device, a sub-function that has never been used among sub-functions of the function of the first user device related to the usage type whose proficiency is adjusted upwards, and
  select the recognized sub-function as the recommended function.

9. The electronic device of claim 1, wherein the instructions further cause the processor to:
  determine a recommendation time point, based on at least the usage type corresponding to the recommended function, and
  transmit information indicating the recommendation time point to the first user device or the second user device such that the recommendation information is displayed at the recommendation time point.

10. The electronic device of claim 9, wherein the recommendation time point is a time point when the first user device registered in the user device group is used for a first time, a time point before the first user device is used, a time point when the first user device is in use, or a time point after the first user device is used.

11. The electronic device of claim 9, wherein the instructions further cause the processor to:
  provide the recommendation information differently depending on the recommendation time point.

12. The electronic device of claim 1, wherein the instructions further cause the processor to:
  generate the customized manual by using the group profile and a stored manual for the functions of the first user device.

13. The electronic device of claim 12, wherein the instructions further cause the processor to:
  as a part of an operation of generating the customized manual by using the group profile and a default manual containing items corresponding to the functions of the first user device, generate the customized manual by adjusting an order of function items of the default manual so that a function item corresponding to a usage type having a higher preference is preferentially selected instead of a function item corresponding to a usage type having a lower preference.

14. The electronic device of claim 12, wherein the group profile further includes information indicating the user's proficiency for each usage type, and
  wherein the instructions further cause the processor to:
  generate the customized manual by adjusting an order of function items of the default manual so that a function item having a low proficiency is preferentially selected instead of a function item having a high proficiency.

15. The electronic device of claim 1, wherein the instructions further cause the processor to:
  as a part of an operation of generating the customized manual, classify, using a usage history of the third user device, functions of the third user device in an order of use frequency,
  select functions having a given rank or higher from among the functions of the third user device,
  select, from among the selected functions of the third user device, a function that is not set in the first user device, and
  generate the customized manual by adding an item corresponding to the selected function that is not set in the first user device to a manual of the first user device.

16. The electronic device of claim 1, wherein the instructions further cause the processor to:
  when user devices similar to the first user device are retrieved from a device information database of the user device group, classify functions of the retrieved user devices in an order of use frequency by using usage histories of the retrieved user devices,
  select functions having a given rank or higher from among the classified functions, and
  generate the recommendation information by combining some of the selected functions.

17. The electronic device of claim 16, wherein the user devices similar to the first user device include:
  a user device having a same type as a type of the first user device, and
  a user device configured to perform a same function as a function of the first user device.

18. A mobile electronic device comprising:
  a communication circuit;
  a display;
  a memory; and
  a processor connected to the communication circuit, the display, and the memory,
  wherein the memory stores instructions causing, upon being executed, the processor to:
  store a usage history in the memory, the usage history collected from a plurality of user devices registered in a user device group through the communication circuit,
  generate, based on the usage history, a group profile that includes information indicating usage types of the user for the user device group and information indicating the user's preference for each usage type,
  receive device information indicating functions of an external electronic device from the external electronic device through the communication circuit,
  select, upon determining that there is no user device of a same type as the first user device in the user device group, and based on the group profile, at least one of the functions of the first user device as a recommended function to a user,
  select, upon determining that there is a third user device of a same type as the first user device in the user device group, and based on a usage history of the third user device, a function of the first user device matched with a function of the third user device as the recommended function,
  select the recommended function from among the functions of the external electronic device, based on at least the usage history,
  generate a customized manual to allow the user to use the recommended function, and
  display, through the display, recommendation information for recommending the customized manual to the user.

19. A mobile electronic device comprising:
  a communication circuit;
  a touch-sensitive display;
  a memory; and
  a processor connected to the communication circuit, the display, and the memory, wherein the memory stores instructions causing, upon being executed, the processor to:
- transmit device information indicating a type of a first user device and functions of the first user device to a server through the communication circuit,
- receive, from the server through the communication circuit, a customized manual for allowing a user to use a function selected by the server from among the functions of the first user device,
- display, through the display, a first message for confirming whether to use the customized manual on the first user device,
- receive a user input through the display in response to the first message, and
- transmit the customized manual to the first user device when the user input indicates that the customized manual is to be used on the first user device, wherein the instructions further cause the processor to:
- receive, from the server, a second message indicating that a user device of a same type as the first user device is not registered in the server,
- display, upon receiving the second message, a third message requesting identification information of a second user device of a same type as the first user device on the display,
- transmit, to the server through the communication circuit, the identification information received in response to the third message through the display,
- display, on the display, information on functions of the second user device received from the server, and
- add, to the customized manual transmitted to the first user device, information indicating a function selected by a user from among the functions of the second user device.

* * * * *